(12) United States Patent
Kim et al.

(10) Patent No.: US 9,319,955 B2
(45) Date of Patent: *Apr. 19, 2016

(54) METHOD AND APPARATUS FOR DEVICE-TO-DEVICE COMMUNICATING IN WIRELESS COMMUNICATION SYSTEM

(71) Applicant: LG ELECTRONICS INC., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 103 days.

This patent is subject to a terminal disclaimer.

(21) Appl. No.: 14/346,021

(22) PCT Filed: Sep. 21, 2012

(86) PCT No.: PCT/KR2012/007583
§ 371 (c)(1),
(2) Date: Mar. 20, 2014

(87) PCT Pub. No.: WO2013/042979
PCT Pub. Date: Mar. 28, 2013

(65) Prior Publication Data
US 2014/0226629 A1    Aug. 14, 2014

Related U.S. Application Data

(60) Provisional application No. 61/537,561, filed on Sep. 21, 2011.

(51) Int. Cl.
*H04Q 7/00* (2006.01)
*H04W 36/22* (2009.01)
*H04W 36/00* (2009.01)
*H04W 76/04* (2009.01)
*H04W 24/02* (2009.01)

(52) U.S. Cl.
CPC .............. *H04W 36/22* (2013.01); *H04W 24/02* (2013.01); *H04W 36/0016* (2013.01); *H04W 36/0066* (2013.01); *H04W 76/043* (2013.01)

(58) Field of Classification Search
None
See application file for complete search history.

(56) References Cited

U.S. PATENT DOCUMENTS 8,577,363 B2 *  11/2013  Wijting et al. ............. 455/426.1
8,588,803 B2 *  11/2013  Hakola et al. ............. 455/452.2
2011/0026492 A1 *  2/2011  Frenger et al. ................ 370/331

(Continued)

FOREIGN PATENT DOCUMENTS

KR    10-2009-0005601 A    1/2009
WO    2010-105145 A1    9/2010
WO    2011-109027 A1    9/2011

OTHER PUBLICATIONS

Nokia Research Center, "Device-to-Device Communication as an Underlay to LTE-Advanced Networks", IEEE Communications Magazine, Dec. 2009 See pp. 42,44.

*Primary Examiner* — Duc C Ho
(74) *Attorney, Agent, or Firm* — Dentons US LLP

(57) ABSTRACT

The present invention relates to a wireless communication system, and more specifically, disclosed are a method and an apparatus for device-to-device (D2D) communicating. The method for D2D communicating in the wireless communication system, according to one embodiment of the present invention, comprises the steps of: a first terminal communicating with a second terminal from a first cell through a D2D link; the first terminal obtaining handover-related information of a second cell; and transferring the handover-related information of the second cell that is obtained to the second terminal.

15 Claims, 12 Drawing Sheets

(56) References Cited

U.S. PATENT DOCUMENTS

| | | | |
|---|---|---|---|
| 2011/0258327 A1* | 10/2011 | Phan et al. | 709/227 |
| 2012/0028672 A1* | 2/2012 | Chen et al. | 455/522 |
| 2012/0100852 A1* | 4/2012 | Horn | 455/436 |
| 2013/0079014 A1* | 3/2013 | Huang et al. | 455/437 |
| 2014/0153390 A1* | 6/2014 | Ishii et al. | 370/230 |

* cited by examiner

FIG. 6
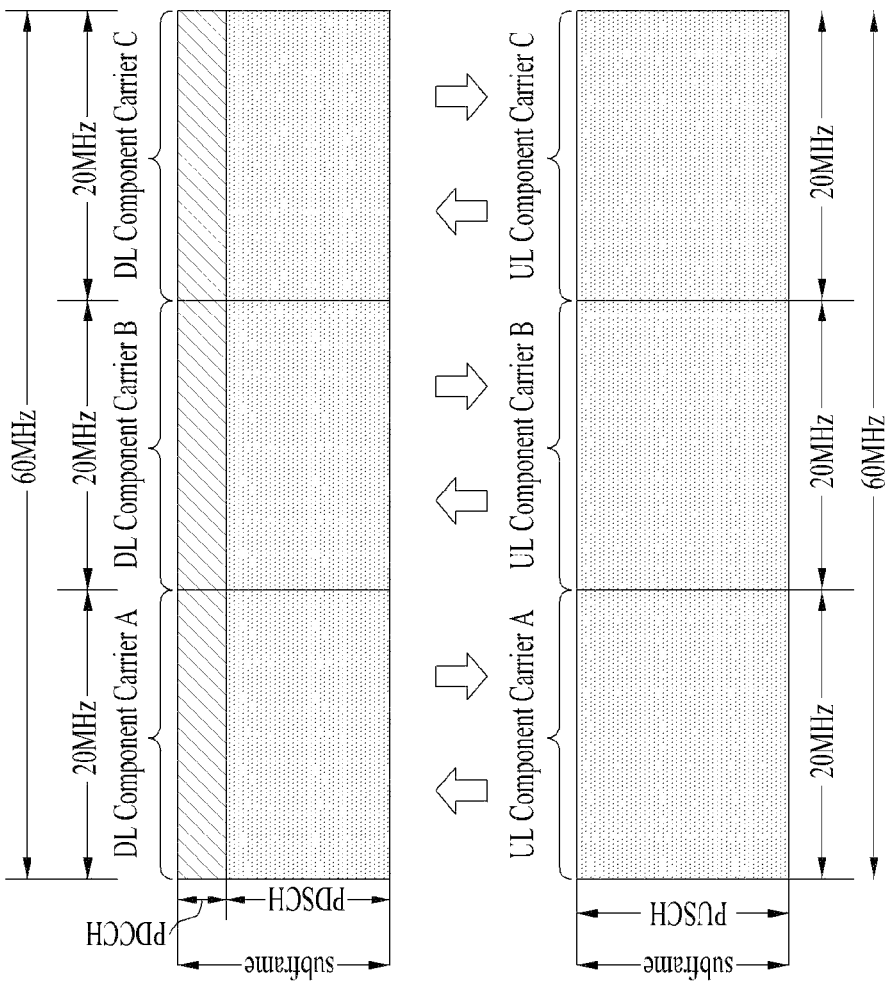
(b) Multiple CC
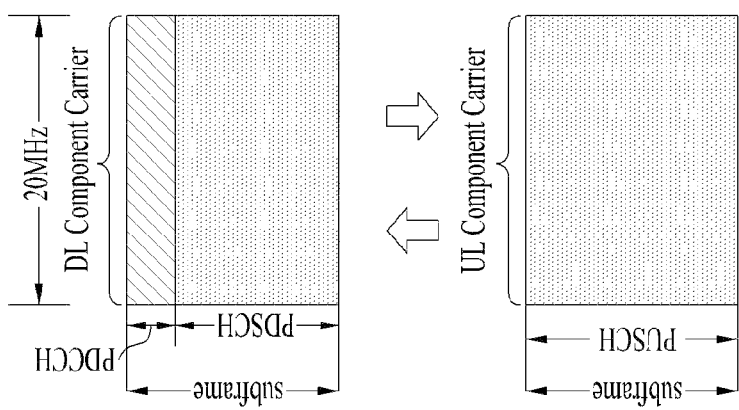
(a) Single CC

METHOD AND APPARATUS FOR DEVICE-TO-DEVICE COMMUNICATING IN WIRELESS COMMUNICATION SYSTEM

This application is a National Stage Application of International Patent Application No. PCT/KR2012/007583, filed on Sep. 21, 2012, which claims priority to and the benefit of U.S. Provisional Application No. 61/537,561 filed on Sep. 21, 2011, and is hereby incorporated by reference.

TECHNICAL FIELD

Following description relates to a wireless communication system, and more particularly, to a method of performing and supporting a device-to-device communication and an apparatus therefor.

BACKGROUND ART

Device-to-device (D2D) communication corresponds to a communication scheme used for directly transmitting and receiving audio, data, and the like without passing through an evolved Node B (eNB) in a manner of establishing a direct link between a plurality of devices (e.g. user equipment (UE)). The D2D communication may include such a communication scheme as a UE-to-UE communication, a peer-to-peer communication, and the like. Moreover, the D2D communication scheme can be applied to an M2M (machine-to-machine) communication, an MTC (machine type communication), and the like.

The D2D communication is considered as a scheme capable of resolving burden of an eNB resulted from rapidly increasing data traffic. For instance, according to the D2D communication, unlike a legacy wireless communication system, since data can be transceived between devices without passing through the eNB, network overload can be reduced.

Further, by introducing the D2D communication, procedures of the eNB can be reduced, consumption of electrical power of devices participating in the D2D can be reduced, data transfer speed can be enhanced, a network capacity can be increased, a load balancing can be performed, and a cell coverage can be enlarged.

DISCLOSURE OF THE INVENTION

Technical Tasks

One technical task of the present invention is to provide a method for a UE to perform a D2D communication and a method for a network to support a D2D communication. Another technical task of the present invention is to provide a method of transmitting and receiving information on resource configuration, transmit power, charging, and the like for the D2D communication as an element technology for the D2D communication. Another technical task of the present invention is to provide a method of transmitting and receiving information necessary for performing the D2D communication for a case that devices participating in the D2D communication are connected to an identical eNB and a case that the devices participating in the D2D communication are connected to eNBs different from each other. The other technical task of the present invention is to provide a method of transmitting and receiving handover-related information to efficiently perform a handover while the D2D communication is maintained in case that at least one of the devices participating in the D2D communication performs the handover.

Technical tasks obtainable from the present invention are non-limited the above-mentioned technical task. Further, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for performing a D2D (device-to-device) communication in a wireless communication system comprises: performing a communication by a first user equipment with a second user equipment via a D2D link in a first cell; obtaining, by the first user equipment, handover-related information on a second cell; and delivering the obtained handover-related information on the second cell to the second user equipment.

To further achieve these and other advantages and in accordance with the purpose of the present invention, according to a different embodiment, a first user equipment device performing a D2D (device-to-device) communication in a wireless communication system includes a reception module configured to receive a signal from an external, a transmission module configured to transmit the signal to the external, and a processor is further configured to: perform a communication by the first user equipment device with a second user equipment device via a D2D link in a first cell; obtain handover-related information on a second cell; and deliver the obtained handover-related information on the second cell to the second user equipment using the transmission module.

In the embodiments according to the present invention, following description can be commonly applied.

Cell-specific D2D communication-related information on the first and the second cell can be exchanged between the first and the second cell.

Cell-specific D2D communication-related information on the first and the second cell can be delivered to the first and the second user equipment.

The cell-specific D2D communication-related information may include at least one of a resource configuration for the D2D communication, a transmit power configuration, information on whether the D2D communication is permitted, or information on whether charging-related information for the D2D communication is reported.

A resource for the D2D communication can be semi-statically configured and activation and release for the D2D communication can be dynamically configured.

The obtaining step can be performed when the first user equipment moves to the second cell.

The obtaining step can be performed when the second user equipment moves to the second cell.

The handover-related information on the second cell can be obtained via a procedure of handover to the second cell by the first user equipment.

The procedure of handover can be performed when the first user equipment does not move to the second cell.

The handover-related information on the second cell can be used for a procedure of attach to the second cell by the second user equipment.

Measurement information on each of the first and the second cell measured by the second user equipment can be feedback via the first user equipment.

The first user equipment may correspond to a master user equipment and the second user equipment may correspond to a slave user equipment.

The first and the second user equipment may operate as a slave user equipment and a master user equipment, respectively, in the first cell. The first and the second user equipment may operate as the master user equipment and the slave user equipment, respectively, in the second cell.

The handover-related information on the second cell may include at least one of a cell identifier of the second cell or resource configuration information of the second cell.

It is to be understood that both the foregoing general description and the following detailed description are exemplary and explanatory and are intended to provide further explanation of the invention as claimed.

Advantageous Effects

According to the present invention, a method for a UE to perform a D2D communication and a method for a network to support a D2D communication can be provided.

Effects obtainable from the present invention may be non-limited by the above mentioned effect. Further, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a diagram for explaining carrier aggregation;

BEST MODE

Mode for Invention

Figure 1:
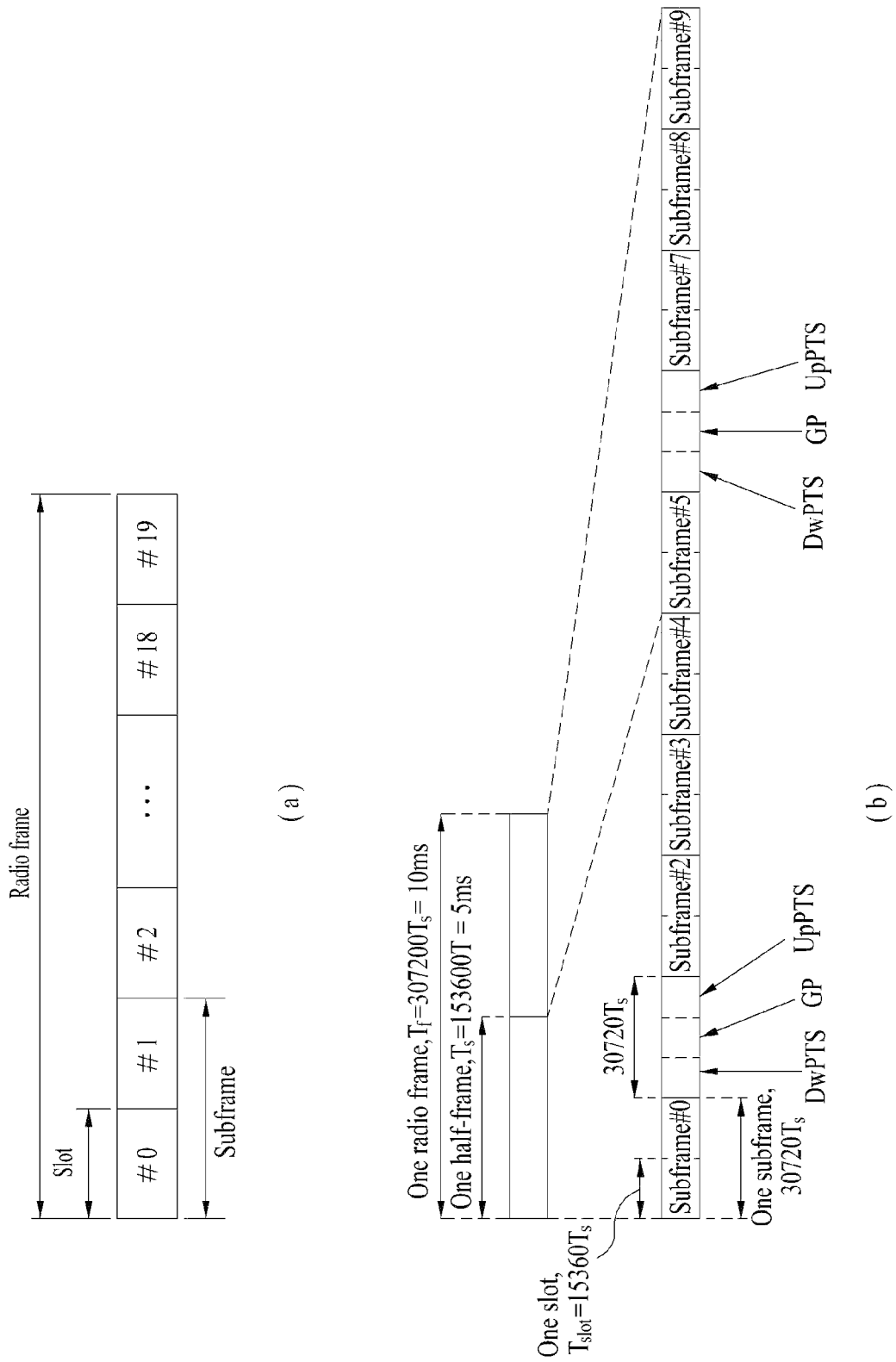
FIG. 1 is a diagram for explaining a structure of a radio frame.

The following embodiments may correspond to combinations of elements and features of the present invention in prescribed forms. Further, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between a base station and a user equipment. In this case, a base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a user equipment can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. Further, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

In some cases, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). Further, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure for a radio frame of 3GPP LTE system is explained with reference to FIG. 1.

In a cellular OFDM (orthogonal frequency division multiplex) radio packet communication system, UL/DL (uplink/downlink) data packet transmission is performed by a unit of subframe. Further, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots in time domain. Further, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

FIG. 1 (b) is a diagram for a structure of a downlink radio frame of type 2. A type 2 radio frame includes 2 half frames. Each of the half frames includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. Further, the number of subframes included in a radio frame, the number of slots included in the subframe and the number of symbols included in the slot may be modified in various ways.

Figure 2:
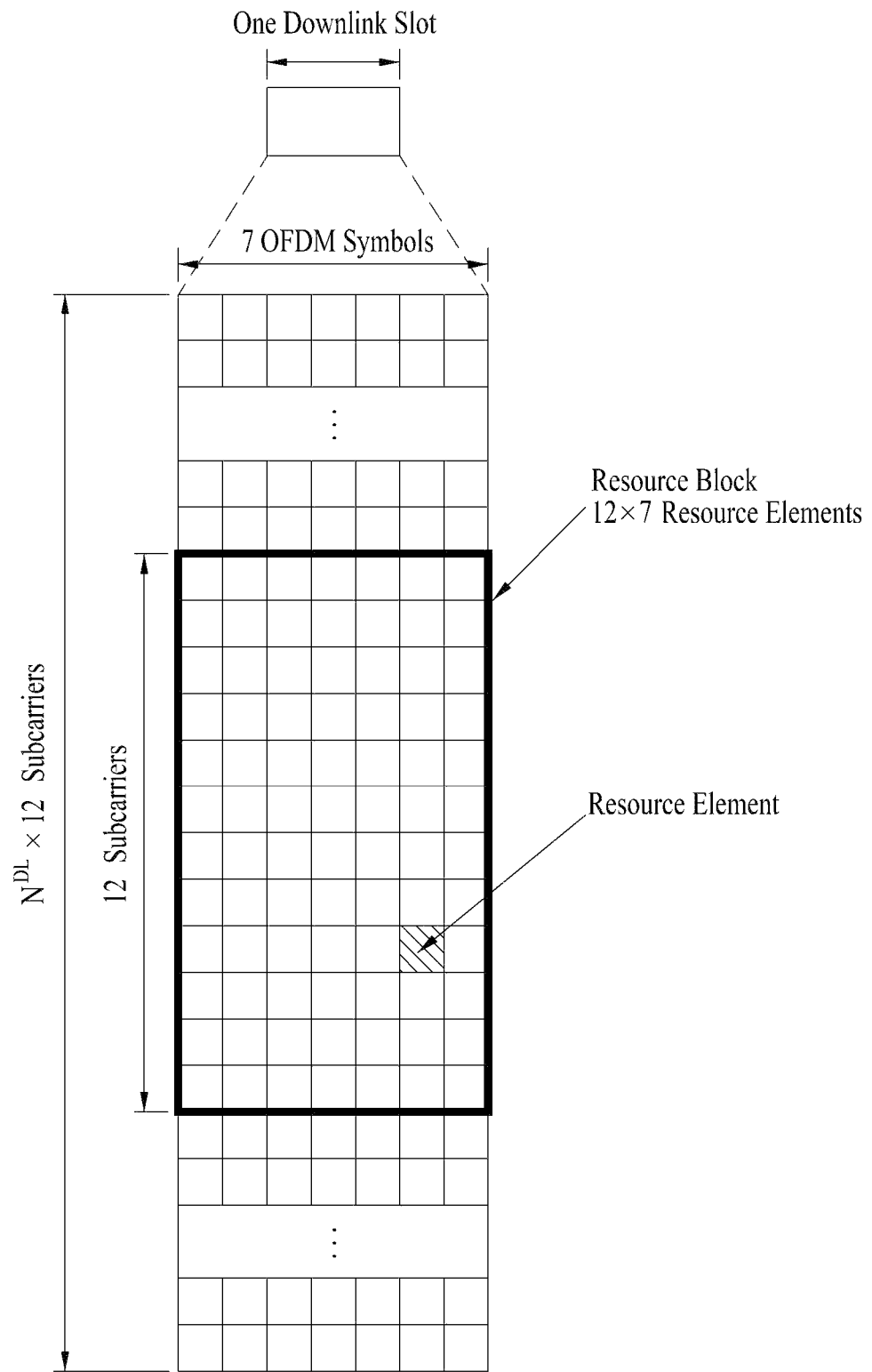
FIG. 2 is a diagram for a resource grid in a downlink slot.

FIG. 2 is a diagram for a resource grid in a downlink slot. Referring to FIG. 2, one downlink (DL) slot includes 7 OFDM symbols in time domain and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. Further, the structure of an uplink (UL) slot may be identical to that of the DL slot.

Figure 3:
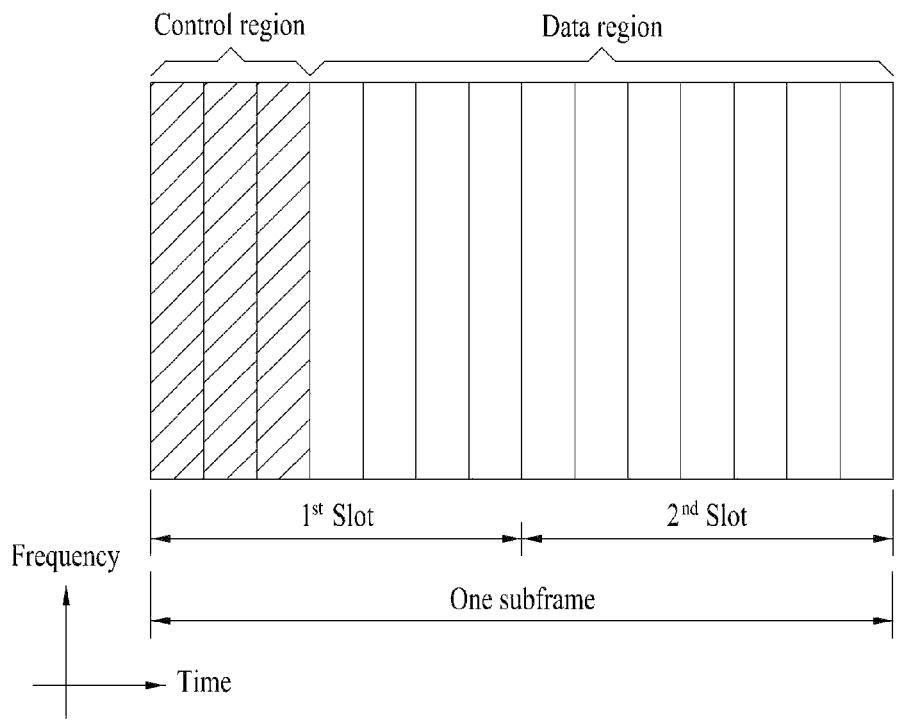
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
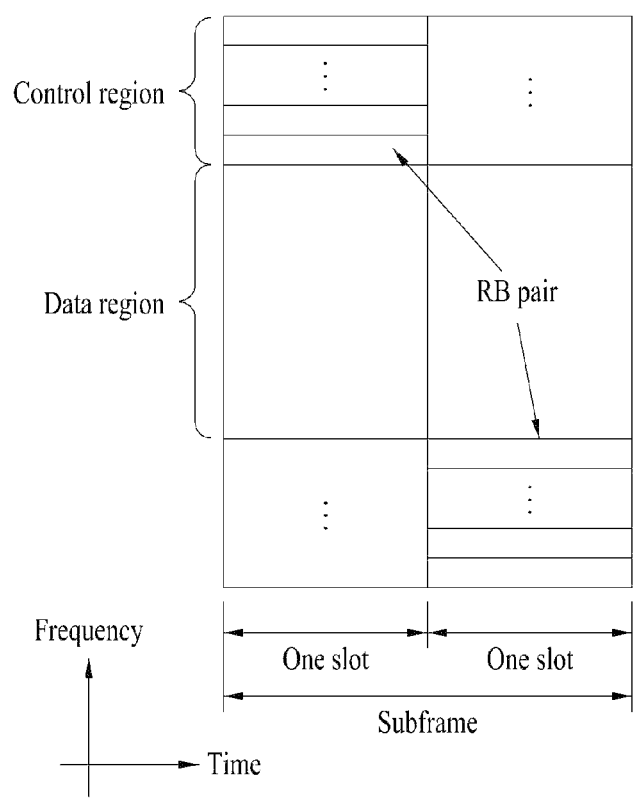
FIG. 4 is a diagram for a structure of an uplink subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. Further, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Cooperative Multi-Point (CoMP)

According to an improved system performance requirement of a 3GPP LTE-A system, a CoMP transmission/reception technology MIMO (also represented as a co-MIMO, a collaborative MIMO, a network MIMO, or the like) is proposed. The CoMP technology increases the performance of a user equipment situating at a cell edge and can increase an average sector throughput.

In general, in a multi-cell environment where a frequency reuse factor corresponds to 1, the performance of a user equipment situating at a cell boundary and the average sector throughput can be reduced due to inter-cell interference (ICI). In order to reduce the ICI, a legacy LTE system has applied a method for enabling the user equipment situating at a cell boundary to have an appropriate throughput performance using such a simple passive scheme as a fractional frequency reuse (FFR) via a UE-specific power control in an environment limited by the interference. Yet, it may be more preferable to reduce the ICI or reuse the ICI as a signal that the user equipment wants than to lower the use of a frequency resource per cell. In order to achieve the aforementioned purpose, CoMP transmission scheme can be applied.

The CoMP scheme applicable in DL can be largely classified into a joint processing (JP) scheme and a coordinated scheduling/beamforming (CS/CB) scheme.

The JP scheme can use a data in each point (base station) of a CoMP cooperative unit. The CoMP cooperative unit means a set of base stations used for a cooperative transmission scheme. The JP scheme can be classified into a joint transmission scheme and a dynamic cell selection scheme.

The joint transmission scheme indicates a scheme transmitting PDSCH from a plurality of points (a part or entire CoMP cooperative units) at a time. In particular, the data transmitted to single user equipment can be simultaneously transmitted from a plurality of transmission points. According to the joint transmission scheme, quality of a reception signal can be coherently or non-coherently enhanced. Further, interference for a different user equipment can be actively eliminated.

The dynamic cell selection scheme indicates a scheme transmitting PDSCH from a point (of a CoMP cooperative unit) at a time. In particular, a data transmitted to single user equipment on a specific timing point is transmitted from one point. A different point within the cooperative unit does not transmit a data to the corresponding user equipment on the specific timing point. The point transmitting the data to the corresponding user equipment can be dynamically selected.

Meanwhile, according to CS/CB scheme, the CoMP cooperative units can cooperatively perform a beamforming of data transmission for single user equipment. In this case, although the data is transmitted from a serving cell only, a user scheduling/beamforming can be determined by a coordination of cells in a corresponding CoMP cooperative unit.

Meanwhile, in case of UL, a coordinated multi-point reception means to receive a signal transmitted by coordination of a plurality of points, which are geographically apart from each other. The CoMP scheme applicable in case of UL can be classified into a joint reception (JR) and the coordinated scheduling/beamforming (CS/CB).

The JR scheme means that a signal transmitted on PUSCH is received by a plurality of receiving points. The CS/CB scheme means that PUSCH is received at one point and a user scheduling/beamforming is determined by coordination of cells in a CoMP cooperative unit.

Relay Node (RN)

For instance, a relay node can be considered to expand coverage of a fast data rate, enhance group mobility, arrange a temporary network, increase a cell boundary throughput and/or provide network coverage in a new region.

A relay node plays a role of forwarding transmission and reception between a base station and a user equipment. Two types of links (a backhaul link and an access link) including attributes different from each other are applied to a carrier frequency band, respectively. A base station may include a donor cell. The relay node accesses a wireless-access network in wireless via the donor cell.

In case that a backhaul link between a base station and a relay node uses a DL frequency band or a DL subframe resource, it may be represented as a backhaul downlink. In case that the backhaul link between the base station and the relay node uses an UL frequency band or an UL subframe resource, it may be represented as a backhaul uplink. In this case, the frequency band corresponds to a resource allocated in a FDD (frequency division duplex) mode and the subframe corresponds to a resource allocated in a TDD (time division duplex) mode. Similarly, in case that an access link between the relay node and user equipment(s) uses a DL frequency band or a DL subframe resource, it may be represented as an access downlink. In case that the access link between the relay node and the user equipment(s) uses an UL frequency band or an UL subframe resource, it may be represented as an access uplink.

It is required for the base station to have functions of UL reception and DL transmission. It is required for the user equipment to have functions of UL transmission and DL reception. Meanwhile, it is required for the relay node to have functions of backhaul UL transmission to the base station, access UL reception from the user equipment, backhaul DL reception from the base station and access DL transmission to the user equipment.

Meanwhile, regarding a band (or spectrum) use of the relay node, one case that a backhaul link and an access link operate on a same frequency band may correspond to 'in-band' and another case that the backhaul link and the access link operate on frequency bands different from each other may correspond to 'out-band'. In both of the above-mentioned two cases, it is necessary for a user equipment (hereinafter, a legacy user equipment) operating in a legacy LTE system (e.g., Release-8) to access a donor cell.

Relay nodes may be classified into a transparent relay node and a non-transparent relay node depending on whether a user equipment recognizes a relay node. In particular, the 'transparent' may mean a case that the user equipment is unable to recognize whether the user equipment is communicating with a network via the relay node. Further, the 'non-transparent' may mean a case that the user equipment is able to recognize whether the user equipment is communicating with the network via the relay node.

Regarding controls of a relay node, relay nodes may be classified into a relay node configured as a part of a donor cell and a relay node capable of controlling a cell by itself.

Although the relay node configured as a part of the donor cell may have a relay node identity (ID), the relay node does not have a cell identity of its own. If at least a part of RRM (Radio Resource Management) is controlled by a base station to which the donor cell belongs thereto (despite that the rest of the RRM is located at the relay node), the above-mentioned relay node may be considered as a relay node configured as a part of the donor cell. Preferably, this sort of relay nodes may be able to support a legacy user equipment. For example, smart repeaters, decode-and-forward relay nodes, various types of L2 ($2^{nd}$ layer) relay nodes, and a type-2 relay node correspond to the above-mentioned relay node.

In case of the relay node configured to control a cell by itself, the relay node controls one or more cells and a unique physical layer cell identity is provided to each of the cells controlled by the relay node. Further, each of the cells controlled by the relay node can use an identical RRM mechanism. In aspect of a user equipment, there is no difference between accessing a cell controlled by the relay node and accessing a cell controlled by a general base station. Preferably, the cell controlled by the above-mentioned relay node may be able to support a legacy user equipment. For example, a self-backhauling relay node, an L3 (3rd layer) relay node, a type-1 relay node, and a type-1a relay node may correspond to the above-mentioned relay node.

The type-1 relay node corresponds to an in-band relay node and controls a plurality of cells. Further, a user equipment may consider each of a plurality of the cells as an individual cell discriminated from a donor cell. Moreover, each of a plurality of the cells has a physical cell ID (defined in LTE Release-8) of its own and the relay node may be able to transmit a synchronization channel of the relay node, a reference signal and the like. In case of a single-cell operation, the user equipment may directly receive scheduling information and a HARQ feedback from the relay node and may be able to transmit a control channel (scheduling request (SR), CQI, ACK/NACK, etc.) of the user equipment to the relay node. Moreover, legacy user equipments (e.g., user equipments operating in LTE Release-8 system) may consider the type-1 relay node as a legacy base station (e.g., a base station operating according to the LTE Release-8 system). In particular, the type-1 relay node has backward compatibility. Meanwhile, in the aspect of the user equipments operating according to the LTE-A system, since the type-1 relay node is considered as a base station different from the legacy base station, performance can be enhanced.

Besides the operation of out-band, the type-1a relay node has the same features of the aforementioned type-1 relay node. The operation of the type-1a relay node can be configured to minimize (or eliminate) the influence on L1 (first layer) operation.

The type-2 relay node corresponds to an in-band relay node and does not have a separate physical cell ID. Hence, the type-2 relay node does not form a new cell. The type-2 relay node is transparent to a legacy user equipment and the legacy user equipment is unable to recognize the presence of the type-2 relay node. Although the type-2 relay node is able to transmit PDSCH, it may not transmit at least CRS and PDCCH.

Meanwhile, In order to make the relay node perform inband operation, a part of resources in time-frequency space must be reserved for a backhaul link and the part of resources can be configured not to be used for an access link. This configuration may be called 'resource partitioning'.

A general principle related to the resource partitioning in a relay node may be described as follows. First of all, a backhaul downlink and an access downlink may be multiplexed together on a single carrier frequency by Time Division Multiplexing (TDM) scheme (i.e., either the backhaul downlink or the access downlink is activated on a specific time.). Similarly, a backhaul uplink and an access uplink may be multiplexed together on a single carrier frequency by TDM scheme (i.e., either the backhaul uplink or the access uplink can be activated on a specific time).

Regarding the backhaul link multiplexing in the FDD, a backhaul downlink transmission can be performed on a downlink frequency band, and a backhaul uplink transmission can be performed on an uplink frequency band. Regarding the backhaul link multiplexing in the TDD, a backhaul downlink transmission can be performed in a downlink subframe of a base station or a relay node, and a backhaul uplink transmission can be performed in an uplink subframe of the base station or the relay node.

In case of an in-band relay node, for example, if both a backhaul downlink reception from a base station and an access downlink transmission to a user equipment are simultaneously performed on a predetermined identical frequency band, a signal transmitted from the transmitting end of the relay node can be received by the receiving end of the relay node. Hence, signal interference or RF jamming may occur at an RF front-end of the relay node. Similarly, if both an access uplink reception from a user equipment and a backhaul uplink transmission to a base station are simultaneously performed on a predetermined identical frequency band, signal interference may occur at the RF front-end of the relay node. Therefore, it may be difficult to implement the simultaneous transmission and reception on a single frequency band at a relay node unless a sufficient separation between a received signal and a transmitted signal is provided (e.g., a transmitting antenna and a receiving antenna are installed in a manner of being sufficiently spaced apart from each other (e.g., installed on/under the ground)).

Figure 5:
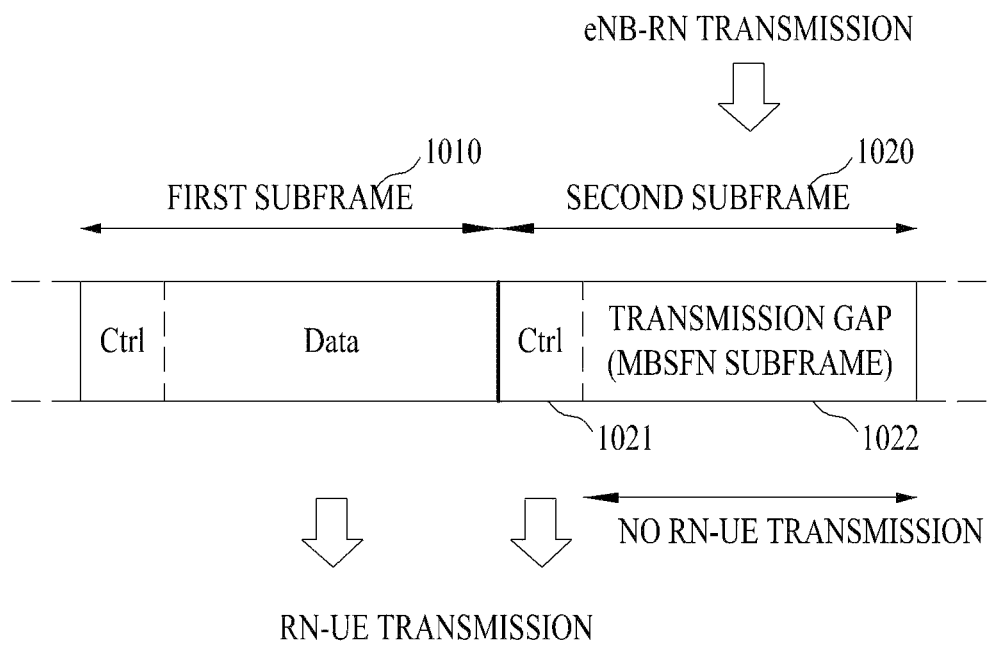
FIG. 5 is a diagram for explaining resource partitioning for a relay.

As a solution for the above-mentioned signal interference problem, it may be able to enable a relay node not to transmit a signal to a user equipment while receiving a signal from a donor cell. In particular, a gap is generated in a transmission from the relay node to the user equipment, and the user equipment (including a legacy user equipment) may be configured not to expect any transmission from the relay node during this gap. Referring to FIG. 5, a first subframe 1010 is a normal subframe and a downlink (i.e., an access down link) control signal and data are transmitted from a relay node to a user equipment. A second subframe 1020 is an MBSFN (multicast broadcast single frequency network) subframe. The control signal is transmitted from the relay node to the user equipment in a control region 1021 of the DL subframe. Yet, no transmission is performed from the relay node to the user equipment in the rest of the region 1022 of the DL subframe. In this case, since a legacy user equipment is configured to expect a transmission of a physical downlink control channel (PDCCH) in all DL subframes (i.e., since it is necessary for the relay node to support the legacy user equipments positioned within a region of the relay node to make the legacy user equipments perform a measuring function in a manner of receiving the PDCCH in every subframe), it is necessary to transmit the PDCCH in all DL subframes for a correct operation of the legacy user equipments. Hence, even in the subframe (second subframe 1020) configured for the downlink (i.e., backhaul downlink) transmission from the base station to the relay node, it is necessary for the relay node not to receive the backhaul downlink but to perform an access downlink transmission in the first N (N is 1, 2, or 3) number of OFDM symbol periods of the subframe. Regarding this, since the PDCCH is transmitted from the relay node to the user equipment in the control region 1021 of the second subframe, backward compatibility for the legacy user equipment serving in the relay node may be provided. In the rest of the region 1022 of the second subframe, the relay node may be able to receive a transmission from the base station while no transmission is performed from the relay node to the user equipment. Therefore, by using the resource partitioning, it may be able to make the access downlink transmission and the backhaul downlink reception not to be performed at the same time in an in-band relay node.

The second subframe 1022 using an MBSFN subframe is explained in detail. Basically, the MBSFN subframe is a subframe used for a MBMS (multimedia broadcast and multicast service) and the MBMS means a service transmitting an identical signal in a plurality of cells at the same time. The control region 1021 of the second subframe may correspond to a relay node non-hearing interval. The relay node non-hearing interval means an interval for the relay node to transmit an access downlink signal without receiving a backhaul downlink signal. As mentioned in the foregoing description, this interval can be configured by the length of 1, 2, or 3 OFDMs. The relay node performs an access downlink transmission to a user equipment in the relay node non-hearing interval 1021 and may be able to receive a backhaul downlink from a base station in the rest of the region 1022. At this time, since the relay node is unable to perform a transmission and reception at the same time on an identical frequency band, it takes time for the relay node to change from a transmission mode to a reception mode. Thus, it is necessary to configure a guard time (GT) in a first prescribed part of the backhaul downlink receiving region 1022 in order for the relay node to switch from the transmission mode to the reception mode. Similarly, in case that the relay node operates to receive the backhaul downlink from the base station and to transmit the access downlink to the user equipment, it may be able to configure the guard time (GT) in order for the relay node to switch from the reception mode to the transmission mode. The length of the guard time may be given by a value of the time domain. For instance, the length of the guard time may be given by the value of k (k=1) number of time sample (Ts) or may be configured by the length of one or more OFDM symbols. Or, the guard time of the last part of the subframe may not be defined or configured in case that the relay node backhaul downlink subframe is contiguously configured or according to a prescribed subframe timing alignment relation. In order to maintain backward compatibility, the guard time can be defined on the frequency domain configured for the backhaul downlink subframe transmission only (if the guard time is configured in the access downlink interval, a legacy user equipment may not be supported). The relay node may be able to receive PDCCH and PDSCH in the backhaul downlink reception interval 1022 except the guard time. In particular, PDCCH for the relay node may be represented as an R-PDCCH (relay-PDCCH) in a meaning of a relay node-dedicated physical channel.

Carrier Aggregation

FIG. 6 is a diagram for explaining carrier aggregation. Before the carrier aggregation is explained, a concept of a cell introduced to manage a radio resource in LTE-A is preferentially explained. A cell can be comprehended as a combination of a DL resource and a UL resource. In this case, the UL resource is not a mandatory element. Hence, the cell may be configured with the DL resource only or both the DL resource and the UL resource. Yet, this is a definition of a current LTE-A release 10 only. Alternately, the cell may also be configured with the UL resource only. The DL resource and the UL resource can be called a downlink component carrier (DL CC) and an uplink component carrier (UL CC), respectively. The DL CC and the UL CC can be represented as a carrier frequency and the carrier frequency means a center frequency in a corresponding cell.

A cell can be classified into a primary cell (PCell) operating on a primary frequency and a secondary cell (PCell) operating on a secondary frequency. The PCell and the SCell can be commonly called a serving cell. The PCell may correspond to a cell indicated in a process of performing an initial connection establishment, a process of connection re-establishing, or process of a handover. In particular, the PCell can be comprehended as a cell becoming a center of controlling in a carrier aggregation environment described in the following. PUCCH can be assigned to a user equipment in the PCell of the user equipment and can be transmitted by the user equipment in the PCell. The SCell is configurable only after an RRC (radio resource control) connection has been established. Further, the SCell may be usable to provide an additional radio resource. In the carrier aggregation environment, the rest of serving cells except the PCell can be considered as the SCell. In case of a user equipment in a state of RRC_CONNECTED while the carrier aggregation is not configured or a user equipment not supporting the carrier aggregation, there exists a single servicing cell configured with the PCell only. On the contrary, in case of a user equipment in the state of RRC_CONNECTED and the carrier aggregation is configured, there exist one or more serving cells. Further, all serving cells include the PCell and all Scells. For the user equipment supporting the carrier aggregation, a network can configure one or more Scells in addition to the PCell, which is configured in an initial stage of the connection establishment process, after an initial security activation process is initialized.

In the following description, carrier aggregation is explained with reference to FIG. 6. Carrier aggregation is a technology introduced to enable a wider band to be used to meet a requirement of fast transfer rate. Carrier aggregation may be defined as an aggregation of two or more component carriers including carrier frequencies different from each other. Referring to FIG. 6, FIG. 6 (*a*) shows a subframe in case of using a single CC in a legacy LTE system and FIG. 6 (*b*) shows a subframe in case of using carrier aggregation. Referring to FIG. 6 (*b*), 3 components carriers, each of which has a frequency size of 20 MHz, are aggregated together to support total 60 MHz bandwidth. In this case, each of the CCs may or may not be contiguous with each other.

A user equipment can simultaneously receive and monitor DL data via a plurality of DL CCs. A linkage between DL CC and UL CC can be indicated by system information. A DL CC/UL CC link can be fixed or semi-statically configured in a system. Although a total bandwidth of the system is configured by N number of CCs, a frequency band capable of being monitored/received by a specific user equipment can be limited to M (<N) number of CCs. Various parameters for carrier aggregation can be cell-specifically, UE group-specifically, or UE-specifically configured.

Figure 7:
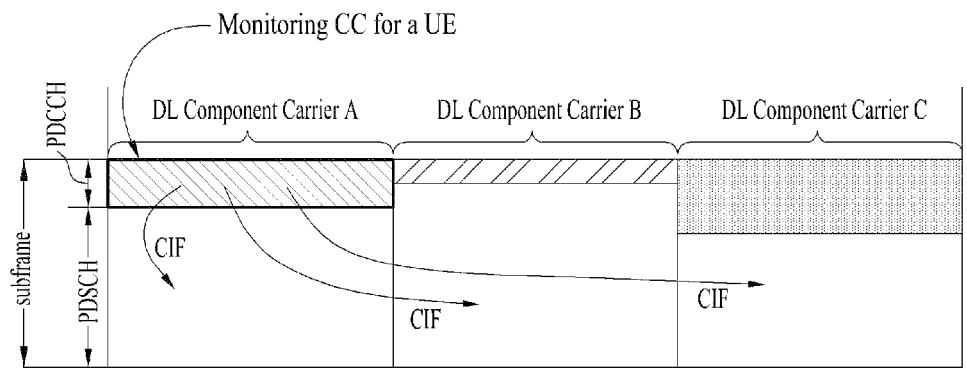
FIG. 7 is a diagram for explaining cross-carrier scheduling.

FIG. 7 is a diagram for explaining cross-carrier scheduling. The cross-carrier scheduling means to include all DL scheduling allocation information of a different DL CC in a control region of a prescribed one DL CC among a plurality of serving cells or to include all UL scheduling grant information on a plurality of UL CCs, which is linked to a DL CC, in a control region of the DL CC among a plurality of serving cells.

First of all, a carrier indicator field (hereinafter abbreviated CIF) is explained.

As mentioned in the foregoing description, the CIF may or may not be included in a DCI format which is transmitted on PDCCH. If the CIF is included in the DCI format, it may indicate that the cross carrier scheduling is applied. If the cross carrier scheduling is not applied, DL scheduling allocation information is valid for the DL CC on which current DL scheduling allocation information is transmitted. Further, UL scheduling grant is valid for one UL CC which is linked to the DL CC on which the DL scheduling allocation information is transmitted.

If the cross carrier scheduling is applied, the CIF indicates a CC which is related to the DL scheduling allocation information transmitted on a prescribed one DL CC via PDCCH. For instance, referring to FIG. 7, DL allocation information on DL CC B and DL CC C, i.e., information on a PDSCH resource is transmitted on PDCCH in the control region of DL CC A. A user equipment can find out a resource region of PDSCH and a corresponding CC via the CIF in a manner of monitoring the DL CC A.

Whether the CIF is included in PDCCH can be semi-statically configured and can be UE-specifically activated via an upper layer signaling.

If the CIF is inactivated (disabled), PDCCH on a specific DL CC allocates a PDSCH resource of the identical DL CC and may be able to allocate a PUSCH resource of UL CC linked to a specific DL CC. In this case, a coding scheme identical to a legacy PDCCH structure, CCE-based resource mapping, a DCI format, and the like can be applied.

Meanwhile, if the CIF is activated (enabled), PDCCH on a specific DL CC can allocate a PDSCH/PUSCH resource on a DL/UL CC indicated by the CIF among a plurality of aggregated CCs. In this case, the CIF can be additionally defined in a legacy PDCCH DCI format. The CIF can be defined by a field of a fixed length of 3-bit or a position of the CIF can be fixed irrespective of a size of a DCI format. In this case, the coding scheme identical to the legacy PDCCH structure, CCE-based resource mapping, the DCI format, and the like can also be applied.

If there exist the CIF, a base station can allocate a DL CC set to monitor PDCCH. By doing so, burden of blind decoding of a user equipment can be reduced. The PDCCH monitoring CC set is a part of the aggregated DL CCs and a user equipment can perform detection/decoding of PDCCH in the corresponding CC set only. In particular, in order to schedule PDSCH/PUSCH for the user equipment, the base station can transmit PDCCH on the PDCCH monitoring CC set only. The PDCCH monitoring DL CC set can be UE-specifically, UE group-specifically or cell-specifically configured. For instance, as depicted in the example of FIG. 7, in case that 3 DL CCs are aggregated, a DL CC A can be configured as a PDCCH monitoring DL CC. If the CIF is inactivated, PDCCH on each DL CC can schedule PDSCH on the DL CC A only. Meanwhile, if the CIF is activated, PDCCH on the DL CC A can schedule PDSCH on different DL CCs as well as PDSCH on the DL CC A. If the DL CC A is configured as the PDCCH monitoring CC, PDSCH is not transmitted to the DL CC B and the DL CC C.

Semi-Persistent Scheduling (SPS)

DL/UL SPS (semi-persistent scheduling) designates which subframes should perform SPS transmission and reception (with a subframe interval and offset) for a UE via an RRC (radio resource control) and actual activation and release of the SPS are performed via PDCCH. In particular, although the SPS is allocated to the UE via the RRC signaling, the UE performs an SPS operation according to PDCCH when the PDCCH informing activation (or reactivation) of the SPS is received (i.e., when the PDCCH in which an SPS C-RNTI is detected is received) instead of immediately performing SPS TX/RX. In particular, if the SPS activation PDCCH is received, a frequency resource according to RB allocation designated by the PDCCH is allocated, modulation according to MCS information and coding rate are applied, and may be then able to start to perform TX/RX with the subframe interval and offset allocated via the RRC signaling. Meanwhile, if PDCCH informing the release of the SPS is received, the UE stops performing TX/RX. If PDCCH informing activation (or reactivation) of the SPS is received, the stopped SPS TX/RX may resume the TX/RX with a subframe interval and offset allocated by the RRC signaling according to the RB allocation, MCS, and the like designated by the PDCCH.

A PDCCH format currently defined by 3GPP LTE includes such various formats as a DCI format 0 used for UL and a DCI format 1, 1A, 1B, 1C, 1D, 2, 2A, 3, 3A, and the like used for DL. Such a control information as hopping flag, RB allocation, MCS (modulation coding scheme), RV (redundancy version), NDI (new data indicator), TPC (transmit power control), cyclic shift DMRS (demodulation reference signal), UL index, CQI (channel quality information) request, DL assignment index, HARQ process number, TPMI (transmitted precoding matrix indicator), PMI (precoding matrix indicator) confirmation, and the like are transmitted in a manner of being selectively combined with each other in accordance with each usage.

More specifically, a use of PDCCH for the purpose of activating/releasing SPS can be validated when a CRC of a DCI transmitted on PDCCH is masked with SPS C-RNTI and NDI is set to 0. In this case, in case of SPS activation, a combination of bit field is set to 0 and uses it as a virtual CRC as depicted in Table 1.

TABLE 1

|  | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' | FDD: set to '000' |

TABLE 1-continued

|  | DCI format 0 | DCI format 1/1A | DCI format 2/2A/2B |
|---|---|---|---|
| Modulation and coding scheme | N/A | TDD: set to '0000' MSB is set to '0' | TDD: set to '0000' For the enabled transport block: MSB is set to '0' |
| Redundancy version | N/A | set to '00' | For the enabled transport block: set to '00' |

The virtual CRC is configured to have an additional error detection capability in a manner of checking whether a corresponding bit field value corresponds to a promised value in case that an error not capable of being checked by a CRC occurs. If an error occurs in a DCI allocated to a different UE and a specific UE cannot detect the error and recognizes the error as SPS activation of the specific UE, since the specific UE continuously uses a corresponding resource, one time error causes a consistent problem. Hence, wrong detection of an SPS can be avoided by using the virtual CRC.

In case of SPS release, a bit field value is set as depicted in Table 2 and use it as a virtual CRC.

TABLE 2

|  | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

D2D Communication

In general, although a D2D communication is limitedly used as a terminology indicating a communication between objects or an object intelligent communication, the D2D communication in the present invention may include a communication between such devices of various forms equipped with a communication function as a smartphone or a personal computer as well as a communication between simple device equipped with a communication function.

Figure 8:
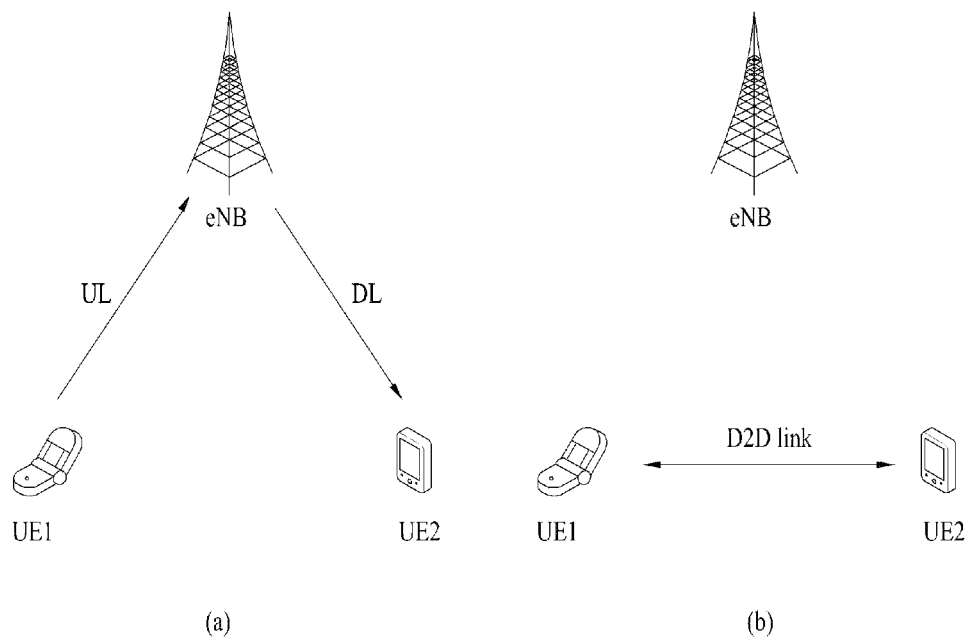
FIG. 8 is a diagram for conceptually explaining a D2D communication.

FIG. 8 is a diagram for conceptually explaining a D2D communication.

FIG. 8(a) shows a legacy communication scheme performed centering on an eNB. A UE1 transmits data to the eNB in UL and the eNB can transmit the data received from the UE1 to a UE2 in DL. This sort of communication scheme may correspond to an indirect communication scheme via the eNB. According to the indirect communication scheme, a Un link (a link between eNBs or a link between an eNB and a relay node and may also be called a backhaul link) defined in a legacy wireless communication system and/or a Uu link (a link between the eNB and a UE or a link between a relay node and a UE and may also be called an access link) may be relevant to each other.

FIG. 8(b) is an example of the D2D communication and shows a UE-to-UE communication scheme. Data exchange between UEs can be performed without passing through the eNB. This sort of communication scheme may correspond to a direct communication scheme between devices. According to the direct communication scheme, a link between devices can be defined as a D2D link (or Ud link). Compared to the legacy indirect communication scheme via the eNB, the D2D direct communication scheme is superior in that the D2D direct communication scheme has reduced latency and uses less radio resource.

For clarity, in performing the D2D communication, a direct communication between 2 devices is explained in the following description as an example, by which the present invention may be non-limited. A principle explained in the present invention can be identically applied to the D2D communication between two or more devices.

1. D2D Resource Configuration

Since a D2D communication is performed by reusing a resource of a legacy radio communication network (e.g., 3GPP LTE or 3GPP LTE-A), the D2D communication should not interfere or disturb the legacy radio communication network. In particular, although actual data transmitted/received between devices is not passing through an eNB, it is necessary to configure a resource used for the D2D communication in a manner of being distinguished from the resource used for the legacy radio communication (i.e., indirect communication via the eNB).

Specifically, an operation for performing a D2D direct communication and an operation for performing an indirect communication via the eNB can affect each other. For instance, a UE uses a DL carrier (or DL frequency band) and a UL carrier (or UL frequency band) distinguished from each other, although the UE including a function of half-duplex includes a reception function and a transmitting function, the UE cannot perform transmission and reception at the same time. The UE cannot simultaneously perform the transmission operation to a D2D counterpart on an identical carrier while performing the reception operation. Similar to this, the UE cannot simultaneously perform the reception operation to the D2D counterpart on an identical carrier while performing the transmission operation. Hence, assume that the operation for performing the D2D direct communication and the operation for performing the indirect communication via the eNB affect each other due to a limitation of not having a full-duplex function. As mentioned in the foregoing description, in case of assuming the half-duplex UE, as a method for the D2D direct communication to coexist with the indirect communication via the eNB, it may be able to consider a method of configuring a resource used for a D2D link communication in a manner of distinguishing it from a resource used for a Uu/Un link communication.

For instance, TDM (time division multiplexing) can be applied between the D2D link communication and the Uu/Un link communication. In particular, a communication between an eNB and a UE may not be scheduled during a time resource (e.g., subframe) in which the D2D link communication is performed. Further, the time resource used for performing the D2D link communication can be predetermined and the D2D link communication can be performed in a D2D-dedicated resource only. Further, a time resource not capable of being used for the D2D link communication can be predetermined and the D2D link communication can be performed in time resources except the time resource.

In the foregoing description, examples are explained on the basis of a D2D resource in time domain for clarity. Yet, a resource permitted to perform the D2D link communication and/or a resource not permitted to perform the D2D link communication can be configured on a frequency domain and/or a spatial domain (e.g., antenna or layer domain). For instance, a specific resource block (RB) may be configured as a frequency resource in which the D2D link communication is performed. Further, it may also be able to configure the D2D link communication to be performed in a specific time domain only on a specific frequency resource. For instance, it may be able to configure a D2D-dedicated RB with 8 ms period and then a D2D communication may be scheduled to be performed in the time period on the domain only.

Information on the resource not permitted to perform the D2D link communication can be implicitly determined by the UE with reference to different information. For instance, among DL subframes, the UE can determine a time/frequency/spatial resource in which system information, a synchronization signal, a control channel, a reference signal and the like are transmitted as the resource domain not permitted to perform the D2D link communication. Or, information on the resource permitted to perform the D2D link communication and/or the information on the resource not permitted to perform the D2D link communication can be explicitly indicated to the UE by a network via signaling.

For instance, a period, a resource, a retransmission method, and the like necessary for performing the D2D link communication can be signaled to the UE, which makes a request for the D2D link communication. By doing so, the UE can perform the D2D link communication on a predetermined (time/frequency/spatial) resource. To this end, it may be able to define a method of signaling a configuration for the D2D link communication. For instance, a subframe interval and offset capable of being used for the D2D link communication are designated to the UE via an upper layer signaling and activation/release of the D2D link communication can be dynamically indicated to the UE via a control channel. Dynamically indicated control information may include information on an RB allocated for the D2D link communication, MCS, and the like. By doing so, similar to the resource configuration for an SPS service, D2D resource configuration can be semi-statically configured.

2. D2D Link Transmission and Uu/Un Link Transmission

A carrier (or frequency band) used for performing a D2D link communication can be determined by either a UL carrier or a DL carrier. Or, both the UL carrier and the DL carrier can be used for the D2D link communication. In a carrier aggregation supportive system, the carrier used for performing the D2D link communication can be separately configured from a carrier used for performing Uu/Un link communication.

Further, in performing a communication between an eNB and a UE, since there exist such an essential signal/information as a broadcast signal, a control channel, a reference signal and the like on a DL carrier, it is difficult to use the DL carrier for the use of the D2D link communication compared to a UL carrier. Hence, it may assume that the UL carrier is used for the use of the D2D link communication. In this case, it may be able to consider a case that a transmission from the UE to the eNB on the Uu/Un link and a transmission from the UE to a different UE on the D2D link are performed at the same time and a case that the transmission from the UE to the eNB on the Uu/Un link and the transmission from the UE to the different UE on the D2D link are not simultaneously performed.

If the transmission on the Uu/Un link and the transmission on the D2D link are not permitted to be simultaneously performed in one UE, each transmission can be performed on a resource permitted according to the aforementioned D2D resource configuration.

Meanwhile, if the transmission on the Uu/Un link and the transmission on the D2D link are permitted to be performed at the same time in one UE, it may occur a case that PUCCH (hereinafter called macro PUCCH) on the Uu/Un link from the UE to the eNB and PUCCH (hereinafter called D2D PUCCH) on the D2D link from the UE to the different UE are transmitted in an identical subframe. Since transmit power of the macro PUCCH is considerably greater than transmit power of the D2D PUCCH in general, if the simultaneous transmission is permitted, the transmission of the D2D PUCCH may be strongly interfered. Although the eNB can configure the transmit power of the macro PUCCH for the UE, the transmit power of the D2D PUCCH can be autonomously determined by the UE in consideration of a path loss on the D2D link and the like. Hence, the present invention proposes a method for the UE performing the D2D link communication to feedback configuration information on the transmit power of the D2D PUCCH to the eNB. By doing so, the eNB can configure the transmit power of the macro PUCCH in consideration of the transmit power of the D2D PUCCH (e.g., to reduce interference on the D2D PUCCH).

The configuration information on the transmit power of the D2D PUCCH, which is feedback by the D2D UE, may be used for an operation, which makes PUCCHs of different types not to be simultaneously transmitted in an identical subframe. Although the UE has capability of simultaneously transmitting the macro PUCCH and the D2D PUCCH, as mentioned in the foregoing description, if interference on the D2D PUCCH is strong, the D2D link communication may not be properly performed. Hence, it may be preferable to transmit PUCCH of one type only in a single subframe. To this end, it is necessary for the eNB to prioritize each of the transmission of the macro PUCCH and the transmission of the D2D PUCCH in a manner of comprehensively considering the configuration information on the macro PUCCH transmit power and the configuration information on the D2D PUCCH transmit power. Further, the eNB can inform the UE of the priority. Moreover, the D2D UE can determine which one is preferentially transmitted among the D2D PUCCH and the macro PUCCH in a manner of comprehensively considering information on the D2D PUCCH transmit power and information on the macro PUCCH transmit power indicated by the eNB. By doing so, if a situation that PUCCHs of different types are simultaneously transmitted occurs, the UE can transmit the PUCCH configured with a high priority, thereby reducing the interference between the D2D link and the Uu/Un link.

The aforementioned example of the present invention may be non-limited to the macro PUCCH transmission and/or the D2D PUCCH transmission. An identical principle proposed by the present invention is applicable to a control of UL transmit power of the UE performing the D2D communication.

3. Transmission and Reception of D2D Communication-Related Information

Figure 9:
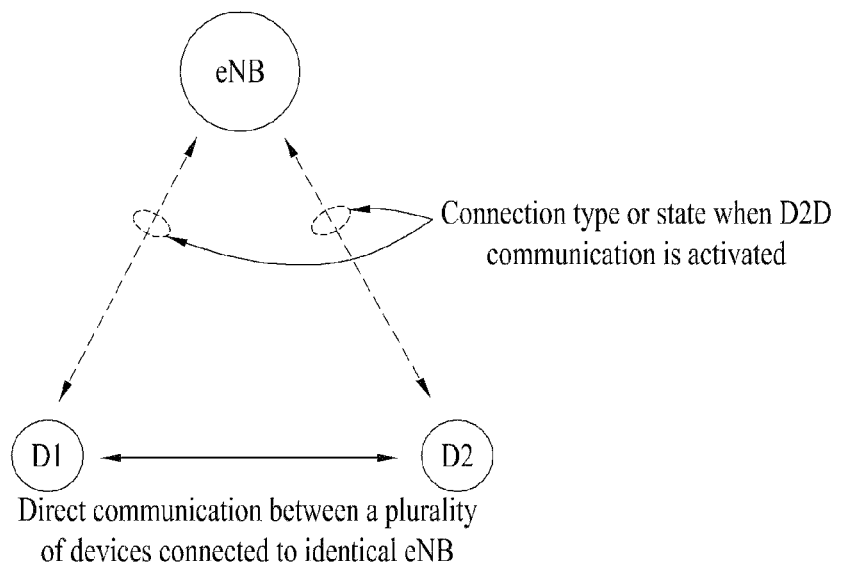
FIG. 9 is a diagram for an example of a direct communication between two devices (D1 and D2) connected to an identical eNB.

FIG. 9 is a diagram for an example of a direct communication between two devices (D1 and D2) connected to an identical eNB.

According to the example of FIG. 9, if a D2D communication is activated, each of a D1 and a D2 may or may not maintain a state of being connected with an eNB. In the example of FIG. 9, assume that each device exists within coverage of the eNB although a connection between the eNB and the D1 or a connection between the eNB and the D2 is not maintained.

In case that the devices participating in the D2D communication are connected to the identical eNB, since the D2D-related configuration (e.g., D2D resource configuration, configuration on a relation between Uu/Un link transmission and D2D link transmission, and the like) mentioned earlier in the aforementioned examples is determined in an identical main agent, a basic D2D communication can be performed according to the aforementioned method of signaling.

In addition, D2D communication-related information used for properly performing the D2D communication can be transceived between the D2D devices (D1 and D2) and the eNB. For instance, the D2D communication-related information may correspond to information on charging. Although the eNB does not involve in the D2D link communication itself, since the D2D communication is performed using a resource for a legacy wireless network, a service provider (operator) providing the wireless network can charge for the D2D link communication. In order to support this, information on a timing on which the D2D communication is activated (or initialized), a timing of releasing (or terminating), D2D communication duration, a size of a frequency resource used for the D2D communication, an amount of transceived data, and the like can be provided to the eNB from the D2D device. To this end, it may be able to define and use a physical layer signaling and/or an upper layer signaling.

Figure 10:
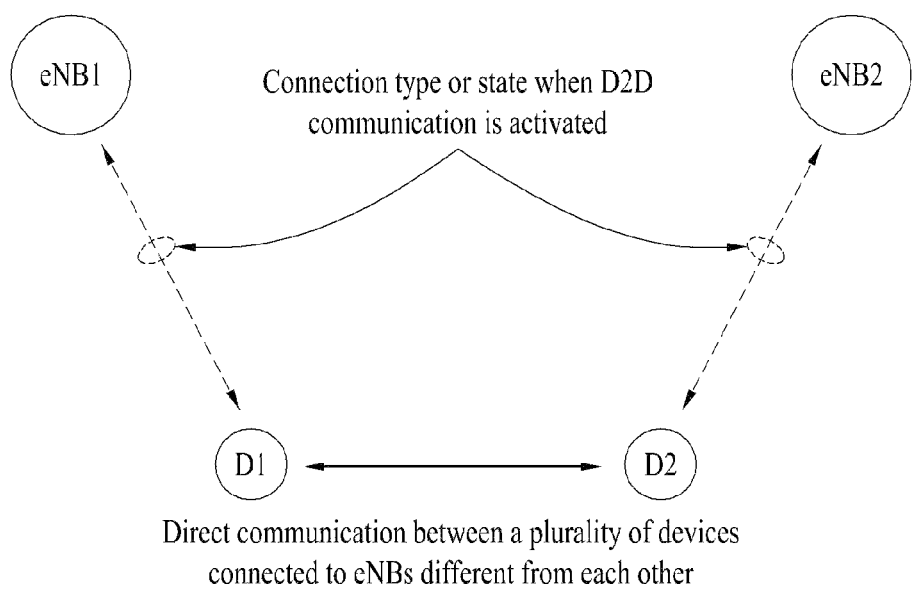
FIG. 10 a diagram for an example of a direct communication between two devices (D1 and D2) connected to eNBs different from each other.

FIG. 10 a diagram for an example of a direct communication between two devices (D1 and D2) connected to eNBs different from each other.

According to the example of FIG. 10, if a D2D communication is activated, a state that a D1 is connected to an eNB 1 and a D2 is connected to an eNB 2 may or may not be maintained. In the example of FIG. 10, assume that each device exists within coverage of the eNB although one or more connections of a connection between the eNB and the D1 and a connection between the eNB and the D2 are not maintained.

In case that the devices participating in the D2D communication are connected to eNBs different from each other, since the D2D-related configuration (e.g., D2D resource configuration, configuration on a relation between Uu/Un link transmission and D2D link transmission, and the like) mentioned earlier in the aforementioned examples is determined in main agents different from each other, it is necessary to exchange the D2D communication-related information between the main agents different from each other in addition to the aforementioned method of signaling.

For instance, information on a resource domain used for the D2D link communication, MCS, and the like, which is signaled by the eNB1 for the D1, should be identically provided to the D2 performing a direct communication with the D1 as well (in this case, although information on the D1 and information on the D2 are practically identical to each other, if cell-specific parameters are different from each other in a cell where each of the devices exists, expression on the information may vary). Hence, the present invention proposes a method of exchanging and determining D2D-related information of the eNB1 (or D1) and D2D-related information of the eNB2 (or D2).

For instance, the eNB1 can inform the eNB2 (ultimately, D2) of the D2D communication-related information configured for the D1. To this end, a predetermined signaling method can be applied. For instance, if fields within a DCI format are configured by a specific value promised in advance in a manner of transforming a PDCCH order indicating a UE to start a random access procedure, it may be able to make the UE recognize that the control information corresponds to a signaling used for providing the D2D-related information from the eNB1 to the eNB2 (or D2). Or, if it is defined that the D2D communication is activated by passing through a handshaking process between eNBs, a signaling method for each of the eNBs to exchange the D2D communication-related informations required by the each of the eNBs with each other can be applied. In the following description, examples for specific processes of transmitting and receiving the D2D communication-related information are explained.

Figure 11:
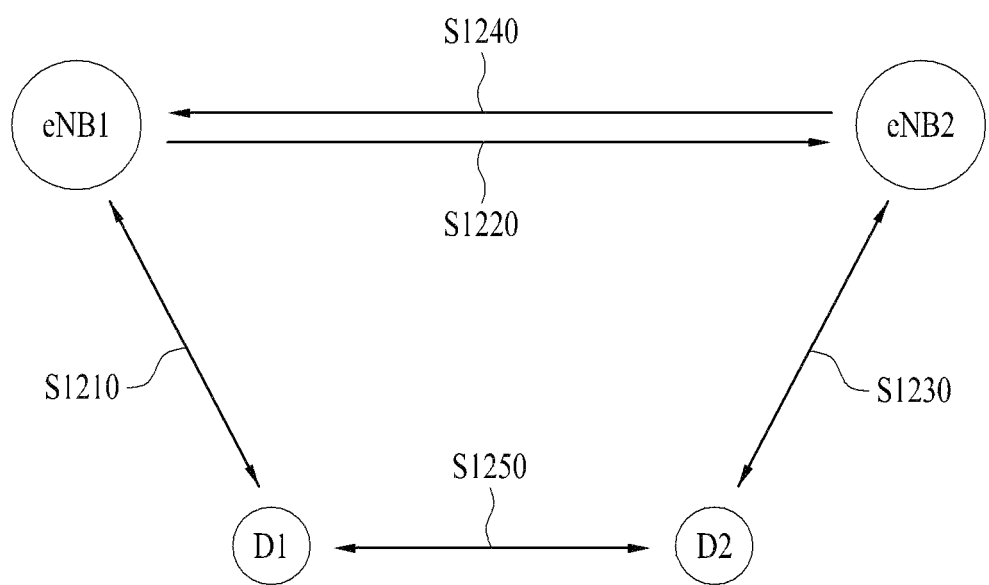
FIG. 11 is a flowchart for explaining a method of transmitting and receiving D2D communication-related information according to one example of the present invention.

FIG. 11 is a flowchart for explaining a method of transmitting and receiving D2D communication-related information according to one example of the present invention. An individual embodiment of the present invention can consist of all or a part of steps depicted in FIG. 11. In particular, an essential configuration of the present invention may be non-limited to the all steps depicted in FIG. 11. Instead, a part of the all steps can be comprehended as the essential part to achieve the purpose of the present invention. For clarity of explanation, the examples of the present invention are explained according to a flow in the following description.

In the step S1210, the eNB1 can provide resource configuration information to the D1 to perform the D2D link communication (i.e., direct communication between the D1 and the D2). Since the D2D resource configuration information on the D1 is designated in advance, the D2D resource configuration information can be broadcasted when the D1 attaches a cell of the eNB1. Or, in case that the D1 has transmitted a message (e.g., scheduling request) to the eNB1 to secure a D2D resource, the eNB1 can provide D2D resource configuration information to the D1 in response to the message. The D2D resource configuration information can be defined by a cell-specific parameter, a UE group-specific parameter, or a UE-specific parameter.

In the step S1220, the eNB1 can transmit a message (e.g., D2D request message) requesting a D2D communication to an eNB2. In this case, the message transmitted to the eNB2 from the eNB1 may correspond to a message for inquiring whether the D2D communication between the D1 and the D2 is available and may include information necessary for performing the D2D communication.

In the step S1230, the eNB2 may transmit a checking signal (e.g., D2D availability checking signal) to the D2 to identify whether the D2 is able to participate in the D2D communication. If the D2 is available for the D2D communication, the D2 can feedback information required by the checking signal to the eNB2.

In the step S1240, the eNB2 can respond whether the D2D is permitted to the eNB1 in consideration of a cell managing situation and a situation of the D2. Specifically, the eNB2 can transmit information received from the D2 and a cell-specific D2D resource domain (time interval, a period, a frequency resource, and the like) to the eNB1. If a D2D available resource determined by the eNB2 and the like are matched with the D2D communication-related information requested by the eNB1 in the step S1220, a confirmation signal can be simply transmitted. If the information requested by the eNB1 is not matched with the information available in the eNB2, a partial or a conditional confirmation signal can be transmitted in case of intending to modify some part. By doing so, a handshaking for the configuration of the D2D communication-related information can be performed between the eNB1 and the eNB2.

For instance, when a resource for the use of the D2D communication is configured with a fixed specific domain according to a cell, if the resource for the use of the D2D communication in a cell of the eNB1 and the resource for the use of the D2D communication in a cell of the eNB2 are different from each other, the D2D communication cannot be performed. Hence, an operation to coordinate the resource for the use of the D2D communication and information exchange can be performed in either the cell of the eNB1 or the cell of the eNB2 or both cells. For instance, information on whether the D2D communication is available, information on whether a reserved resource is available, and the like can be exchanged with each other between eNBs and the eNB may deliver the corresponding information to the UE. If the coordination for the D2D communication-related configuration between the eNBs is successfully performed, the eNB1 and the eNB2 can signal D2D enabling information to the D1 and the D2, respectively (not depicted). Further, the D2D enabling information can also be transmitted to the UE, which is not participating in the D2D.

In the step S1250, the D1 and the D2 can perform a direct communication in the resource domain designated for the D2D communication with a designated scheme. Further, the D1 and/or the D2 may report charging-related information (time interval on which the D2D communication is performed, a resource domain, amount of data, and the like) on the D2D communication to the eNb1 and/or the eNB2 (not depicted).

Regarding the example of the present invention, an additional embodiment of reducing signaling overhead and simplifying procedures is explained in the following description.

If the D1 transmits a scheduling request (SR) for the D2D communication, the eNB1 and the D2 may operate to receive the SR. The scheduling request can be received when the D1 and the D2 are synchronized with each other. If the D1 and the D2 are not synchronized with each other, since it is difficult for the D2 to receive the SR transmitted by the D1, a resource for a D2D-related SR may be allocated in advance to enable both the D1 and the D2 to receive the D2D-related SR. Having received the SR of the D1, the eNB1 can transmit a checking signal indicating whether the D2D communication available to the DL and the D2. The confirmation signal may correspond to a D2D communication activation signaling indicating a use of a specific domain among the resource domain predetermined for the use of the D2D communication. The checking signal transmitted from the eNB1 can be received by the D1 and the D2 at the same time. Or, if there is no direct link between the eNB1 and the D2, the checking signal transmitted from the eNB1 can be delivered to the D2 via the D1.

Further, in case that the eNB1 has identified the D2D-related information of the eNB2 in advance, when the D1 makes a request for the D2D communication, the eNB1 can respond to the D1 in a manner of judging whether the D2D communication is permitted without exchanging information with the eNB2. To this end, it may be able to define and use a signaling configured to exchange the information on the resource domain for the use of the D2D communication between the eNBs and may be able to define and use a signaling configured to deliver the information on the resource domain for the use of the D2D communication from at least one eNB to a different eNB.

4. D2D Communication and Handover

Figure 12:
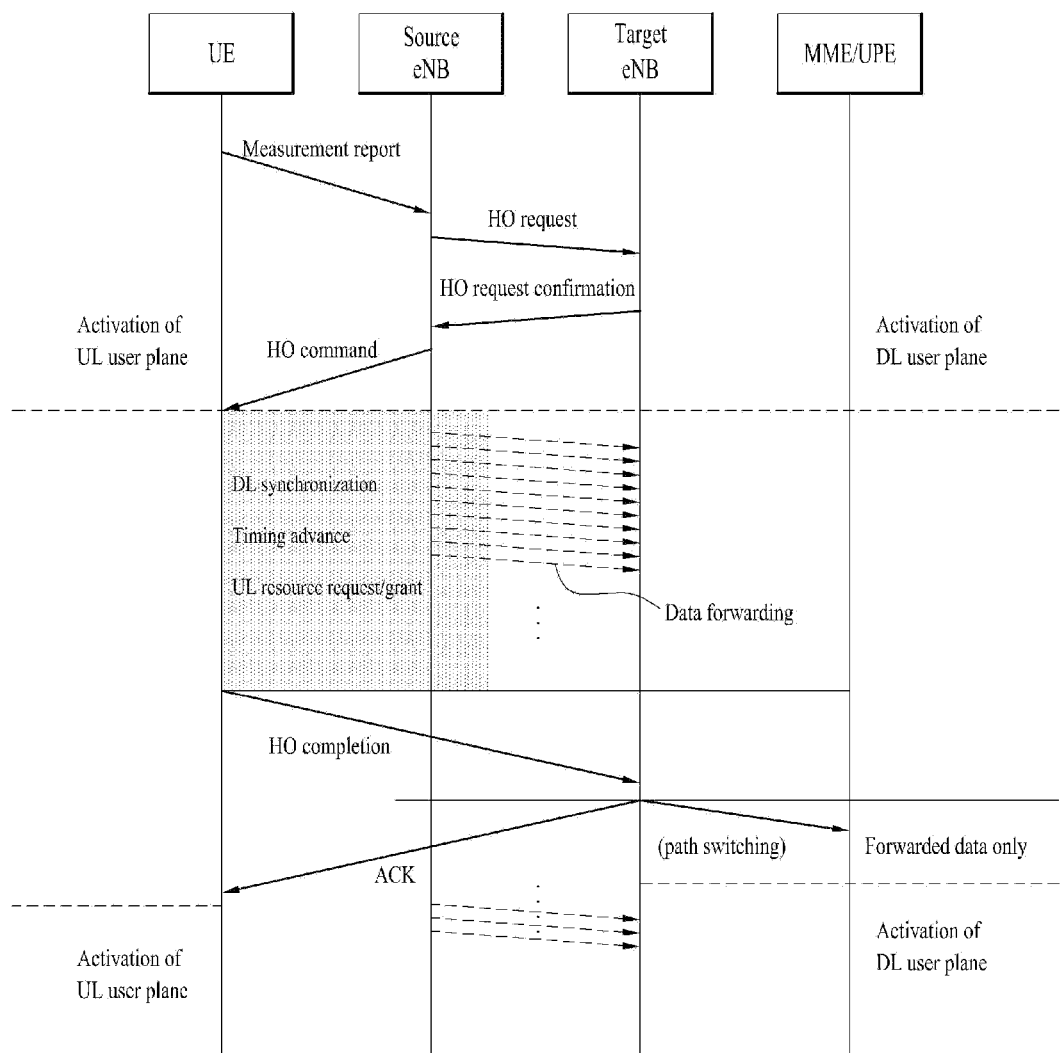
FIG. 12 is a diagram for explaining a general handover procedure.

FIG. 12 is a diagram for explaining a handover procedure applicable to the present invention.

In FIG. 12, assume that a UE makes a handover from a source eNB to a target eNB. For instance, the handover can be performed in case that link quality is deteriorated as the UE moves from the eNB (i.e., source eNB) currently serving. The UE performs measurement for the source eNB and may be able to report a measurement result to the source eNB. Having received the measurement result, the eNB can transmit a HO (handover) request message to the target eNB and may be then able to receive a HO request confirmation message from the target eNB in response to the HO request message. By doing so, the source eNB can transmit a HO command message to the UE.

In this case, UL data transmitted from the UE to a network can be transmitted until the HO command is received. Further, D1 data transmitted from the network to the UE can also be transmitted until the UE receives the HO command. In particular, a user plane can be activated until the UE receives the HO command in UL and DL.

Having received the HO command from the source eNB, the UE performs DL synchronization with the target eNB, performs timing adjustment according to a timing advance command for matching with UL transmission timing, makes a request for a UL resource, and receives a UL grant in response to the request of the UL resource. In the meantime, a UL user plane can be interrupted by a radio L1/L2 signaling and data forwarding can be performed from the source eNB to the target eNB as a background process.

After the above-mentioned operations are completed, the UE can transmit a HO completion message to the target eNB. In the meantime, the UL user plane can be interrupted by a UL RRC signaling. When the target eNB receives the HO completion message, update of the user plane can be performed for an MME (mobility management entity)/UPE (user plane entity).

Subsequently, the target eNB transmits a confirmation response (ACK) message to the UE and performs a path switching for the MME/UPE. In the meantime, the UL user plane can be interrupted by a DL RRC signaling. Further, a DL user plane is interrupted until the path switching is completed. While the path is switched, only the data forwarded from the source eNB can be transmitted to the UE from the target eNB. Data forwarding from the source eNB to the target eNB can be continued after the path switching is completed.

If the UE receives the ACK, the UL user plane can be activated again and the DL user plane can be activated again when the path switching is completed.

Further, a handover can be classified into a backward handover and a forward handover. The backward handover means a scheme requested by the eNB to make the target eNB prepare for a handover. The target eNB generates an RRC message to perform the HO and delivers the message to the source eNB and the UE. The forward handover means a scheme that the UE determines a connection to a target cell by itself and the UE makes a request for maintaining the connection. In case of the forward handover, a connection re-establishment procedure is applied only when the UE lost a connection to a source cell. The connection re-establishment procedure can be successfully performed only when the target cell has prepared for a handover in advance. Meanwhile, LTE system supports a redirection operation. The redirection operation means to move a UE to a different frequency or a RAT (radio access technology) in case that the UE is released from a connection (not a case of establishing a connection).

Since a device related to the D2D communication has mobility, a situation of a handover may occur in performing the D2D communication. In case that a part or all of a plurality of devices related to the D2D communication perform the handover, examples of the present invention to properly and efficiently perform both management of the D2D communication and handover procedures are explained in the following description.

Figure 13:
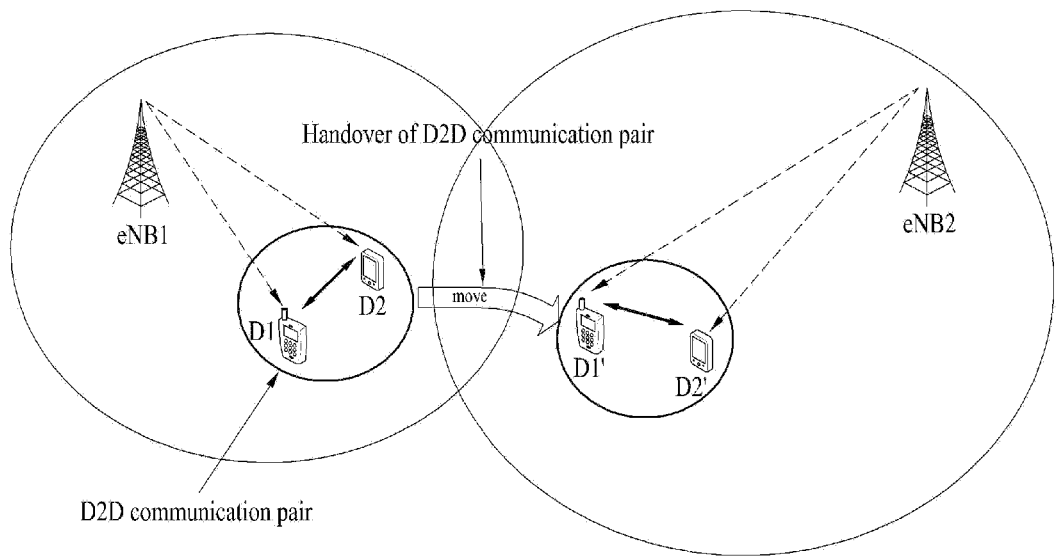
FIG. 13 is a diagram for an example of performing a handover performed by all of devices performing a D2D communication.

FIG. 13 is a diagram for an example of performing a handover performed by all of devices performing a D2D communication.

FIG. 13 shows an example of a case that all devices belonging to a D2D communication group (i.e., D2D communication pair of a D1 and a D2) move to a cell of the eNB2 while a D2D communication between the D1 and the D2 is performed in a cell of the eNB1. In this case, each of the D1 and the D2 can perform a HO procedure. If D2D communication-related information does not vary according to a cell, a HO can be performed without a separate signaling while the D2D communication is maintained. Yet, if a parameter related to the D2D operation varies according to a cell (i.e., in case of a cell-specific parameter among the D2D communication-related information), the parameter should be changed from the parameter for the eNB1 to the parameter for the eNB2 in the course of performing the HO to enable the D2D communication to be seamlessly operated. Hence, it may be able to define and use a signaling configured to deliver the cell-specific parameter among the D2D communication-related information to the D1 and the D2 in the course of performing the HO. For instance, the cell-specific D2D-related parameter can include a resource configuration for the D2D communication, transmit power configuration, information on whether the D2D communication is permitted, information on whether charging-related information for the D2D communication is reported, and the like.

As mentioned in the foregoing description, if the parameter for the D2D resource configuration is semi-statically configured, the corresponding information should be shared between the cells related to the HO and shared by both the D1 and the D2 performing the HO to perform the HO without disconnecting the D2D communication. If the cell to which the D1 and the D2 have moved corresponds to a cell of a relay node, a resource domain (i.e., search space), which should monitor a control channel (i.e., R-PDCCH) of the relay node, can be differently configured according to a cell. In this case, in order to properly decode the R-PDCCH, information on the R-PDCCH search space can be shared between the cells related to the handover and between the D2D devices.

Figure 14:
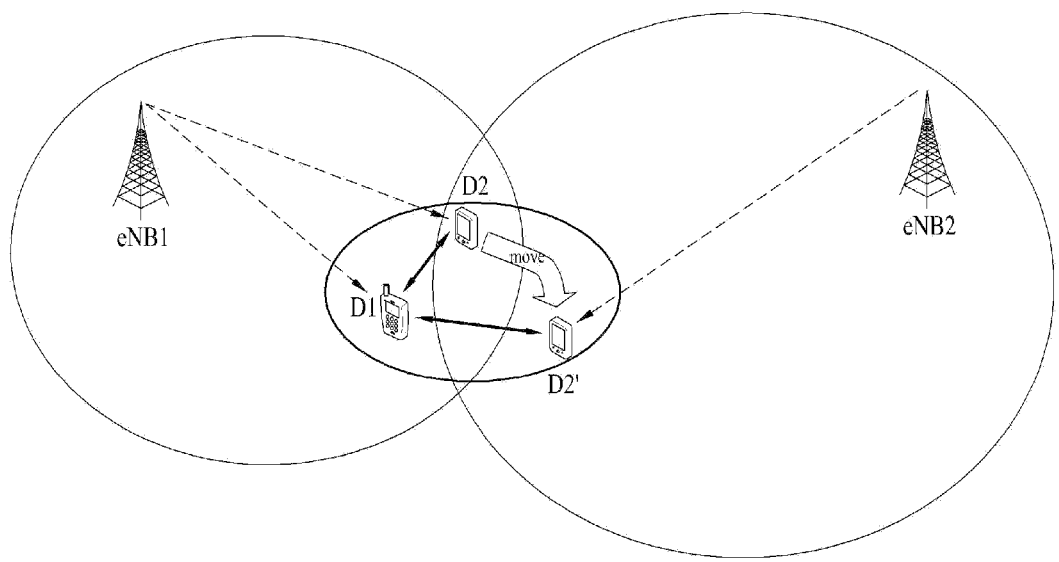
FIG. 14 is a diagram for an example of performing a handover performed by a part of devices performing a D2D communication.

FIG. 14 is a diagram for an example of performing a handover performed by a part of devices performing a D2D communication.

FIG. 14 shows an example of a case that a part of devices belonging to a D2D communication group (i.e., D2D communication pair of a D1 and a D2) move to a cell of the eNB2 while a D2D communication between the D1 and the D2 is performed in a cell of the eNB1. In this case, the D2 should perform a HO procedure and cell-specific information among D2D communication-related information should be delivered to the D2. For instance, if a cell-specific D2D-related parameter including D2D resource configuration information and the like is configured, the D2 can find out which resource is configured for the use of the D2D communication in a cell of the eNB2 when information for specifying a cell is informed to the D2. In this case, a resource domain configured for the use of the D2D communication in the cell of the eNB1 and a resource domain configured for the use of the D2D communication in the cell of the eNB2 may be different from each other. In this case, the D1 and the D2 perform D2D transmission and reception on resource domains different from each other. If the D1 and the D2 are positioned at an identical cell, the D1 and the D2 can perform D2D transmission and reception on an identical resource domain.

In this case, as mentioned earlier in FIG. 10 and FIG. 11, the D2D communication after the handover corresponds to a case that the devices related to the D2D communication belong to cells of the eNBs different from each other, it is necessary to exchange the information on the D2D in the course of performing the handover as mentioned earlier with reference to FIG. 11. For instance, if the eNB 1 and the eNB 2 support the D2D with schemes different from each other, information configured to change/adjust the schemes is exchanged between the eNBs and it may be able to simultaneously define and use a signaling configured to deliver the information to the D2 and the D1.

Figure 15:
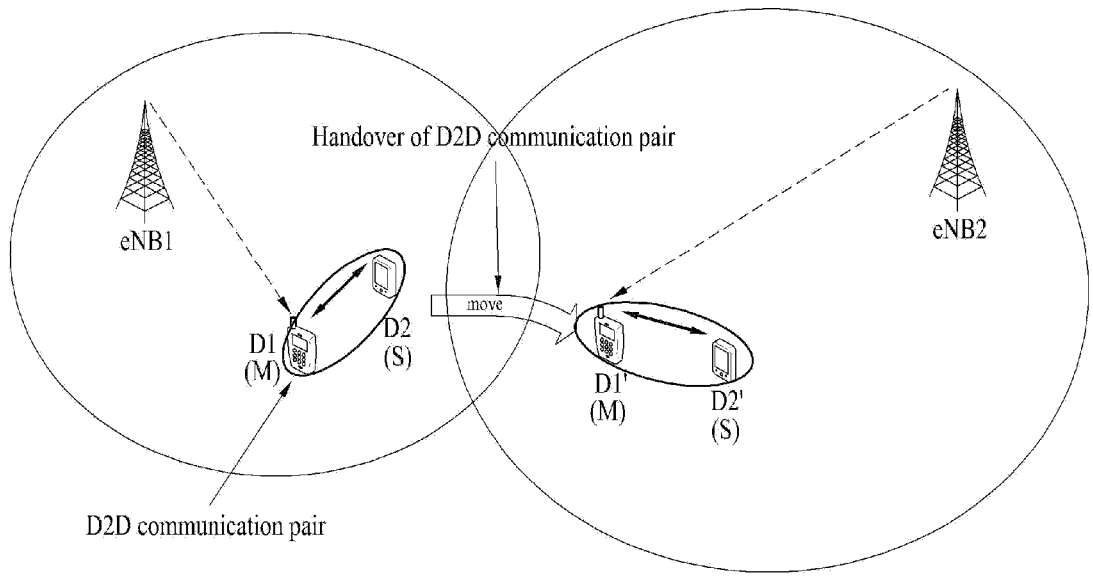
FIG. 15 is a diagram for an example of a case that all devices performing a D2D communication move to a different cell.

FIG. 15 is a diagram for an example of a case that all devices performing a D2D communication move to a different cell.

FIG. 15 shows an example of a case that the D2 does not have a direct link with the eNB and the D1 plays a role of a relay node between the eNB and the D2. In particular, the D1 can perform a D2D direct communication with the D2 and may perform an operation of the relay node for a communication between the D2 and the eNB. In this case, the D1 may correspond to a master or a primary device and the D2 may correspond to a slave or a secondary device. Referring to FIG. 15, the D1 is represented as M (master) and the D2 is represented as S (slave).

FIG. 15 shows an example of a case that all devices belonging to a D2D communication group (i.e., D2D communication pair of D1 and D2) move to a cell of the eNB2 while a D2D communication between a master device and a slave device is performed. A UE moving to a different cell needs to perform a handover. Yet, the D2 performs a communication with the eNB2 via the D1 without performing a direct communication with the eNB2 even after the D2 has moved to a different cell of the eNB2. Hence, despite the fact that the D2 does not perform a handover, if the D1 properly performs a handover, the D2D communication and the communication between the D2 and the eNB2 via the D1 can be performed with no problem.

In case that the D2 intends to perform an idle mode handover (e.g., cell selection), information on the eNB2 should be provided to the D2. Further, if the D2 intends to attach to the eNB2 as a normal UE after completing the direct communication with the D1, it is necessary to perform a cell search process including a previously defined attach process and a cell reselection process. In this case, in case that the D2 has already known the information on the eNB2, the cell search process can be efficiently performed and operations of the cell search process can be simplified.

If both the master device (e.g., D1) and the slave device (e.g., D2) performing the D2D communication move to a target cell, the present invention proposes that the master device delivers information, which is received by the master device, on the target cell, i.e., handover (HO)-related information to the slave device although the master device actually performs a handover only. By doing so, when the slave device performing the D2D communication switches to a normal indirect communication mode from the D2D direct communication mode, a delay occurring in the cell selection or the cell search process is reduced and an efficient operation can be performed.

In this case, the handover-related information indicates information necessary for a UE to operate in a target cell. For instance, the HO-related information may include information (e.g., cell ID) for specifying the target cell, information (e.g., QoS information, etc.) on a radio bearer provided by the target cell, resource configuration information provided by the target cell, a new temporary identifier (e.g., target C-RNTI) usable by a UE in the target cell, and the like. Further, the handover-related information of the target cell may include cell-specific D2D-related information (e.g., resource configuration necessary for performing the D2D communication in the target cell, transmit power configuration, information on whether the D2D communication is permitted, information on whether charging-related information for the D2D communication is reported, and the like) which is necessary to perform the D2D communication in the target cell.

Further, the handover-related information can be exchanged and shared between cells (source cell and target cell) involved in the handover. For instance, the source cell can obtain the handover-related information of the target cell in the course of performing the handover. For instance, the source cell and the target cell can obtain the handover-related information of the other party with a scheme similar to the signaling of requesting and providing the D2D communication-related information mentioned earlier in the step S1220 and S1240 of FIG. 11. The source cell may directly deliver the handover-related information of the target cell to the master and the slave device performing the D2D communication or deliver the information to the slave device via the master device.

In case that the D2D communication is performed, in order to support seamless D2D communication under a situation that a service area is changing, it may be able to consider forcibly making devices participating in the D2D communication handover to an identical cell. This is because, if the devices participating in the D2D communication belong to cells different from each other, a cell-specific parameter (e.g., resource configured for the use of the D2D communication) varies. Hence, it is designed to prevent the D2D communication from being complicatedly or hardly implemented. As mentioned in the foregoing description, in case that the target cell to which the device performing the D2D communication making a handover is limited to an identical cell, the method of delivering the handover-related information of the target cell to the slave device proposed by the present invention can be usefully applied.

Figure 16:
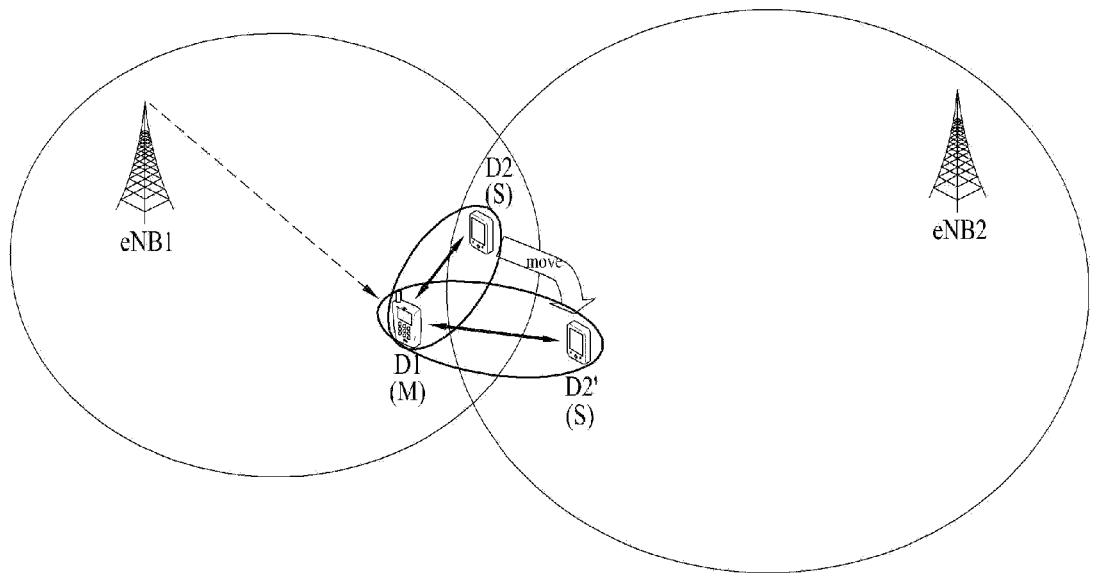
FIG. 16 is a diagram for an example of a case that a part of devices performing a D2D communication move to a different cell.

FIG. 16 is a diagram for an example of a case that a part of devices performing a D2D communication move to a different cell.

Similar to the example of FIG. 15, the example of FIG. 16 assumes that the D1 and the D2 perform the D2D communication, the D1 corresponds to a master device playing a role of a relay node for the D2, and the D2 corresponds to a slave device. Yet, FIG. 16 shows the example of a case that a part (e.g., D2) of devices belonging to a D2D communication group (i.e., D2D communication pair of the D1 and the D2) moves to a cell of the eNB2 while the D2D communication between the D1 and the D2 is performs in a cell of the eNB1. In a normal case, the D2 should make a handover to a target cell (the cell of the eNB2). Yet, since the D2 receives a service from the eNB1 via the D1, it is not necessary for the D2 to immediately make a handover to the target cell although the D2 has moved to the target cell.

In this case, if the D2 intends to operate as a normal UE after completing the D2D communication, the D2 should perform such a process as a cell search and the like including a process of attaching to the eNB2 and a cell reselection operation. If the D2 knows information (e.g., handover-related information) on the eNB2 in advance, a delay occurring in the process of cell search and the like is reduced and efficiency of operation can be enhanced.

Hence, the present invention proposes a method that the D1 obtains the handover-related information on the eNB2 and delivers the information to the D2 in advance. Since the D1 is currently positioned at a cell of the eNB1, it is not necessary for the D1 to make a handover to the eNB2. Yet, if the D1 identifies a state of the D2, which has moved to the eNB2, the D1 can perform an operation of obtaining the handover-related information of the eNB2. For instance, although the D1 does not actually make a handover to the eNB2, the D1 can obtain the handover-related information on the eNB2 in a manner of requesting a handover to the eNB2. Although the D1 has obtained the handover-related information of the eNB2, the D1 may not make a handover to the eNB2. This sort of handover process can be named a virtual handover process.

In particular, the D1 makes a virtual handover to the eNB2 in accordance with a state (or position) of the D2, obtains handover-related information of the eNB2, and may be then able to deliver the handover-related information of the eNB2 to the D2. By doing so, time necessary for the D2 to attach to the eNB2, unnecessary procedure, and the like can be reduced.

Further, it may be able to consider that measurement information of the D2 is delivered to the eNB via the D1. As a general UE operation, the D2 can perform a sell reselection procedure and the like by measuring strength of a reception signal (e.g., RSRP (reference signal received power)) received from each of the eNBs. In this case, if the D2 performs a communication with the eNBs in a manner of depending on the D1, the measurement information measured by the D2 such as RSRP can be delivered to the eNB1 via the D1. In particular, DL measurement performed by the D2 is to measure a direct link from each of the eNBs. Yet, the information measured by the D2 can be feedback to the eNB1 via a relay node function of the D1. By doing so, the D1 can identify a fact that the D2 has moved to the cell of the eNB2 from the measurement information of the D2. Further, as mentioned in the foregoing description, the D1 may obtain the handover-related information on the eNB2 and perform an operation of delivering the information to the D2.

As an additional method for the D2 to obtain information on the eNB2, the present invention proposes a method of swapping a role between D2D devices. In particular, while the D1 operating as a master device and the D2 operating as a slave device perform the D2D communication in a cell of the eNB1, if the D2 moves to a cell of the eNB2, the D2 and the D1 can be swapped into the master device and the slave device, respectively. By doing so, the D2 actually makes a handover to the eNB2 as the master device and the D1 can receive a service from the eNB2 via the D2 as the slave device. By doing so, the D2 can directly obtain the handover-related information of the eNB2. Further, since the D1 has information on the eNB1 at which the D1 is positioned, if the D2D communication is completed, an operation for the D1, which is used to be the slave device, to attach to the cell of the eNB1 can be simplified. Or, after the D1 is swapped into the slave device, if the D2D device is limited to operate in an identical cell (i.e., cell of the eNB2), the D1 receives the handover-related information on the eNB2 from the D2 corresponding to the master device and can make a handover to the eNB2 without any delay. The principle of the present invention can be expressed in a different way as follows. In performing the D2D communication, a HO is performed by the master device (or primary device) only. The slave device (or secondary device) makes a handover using the handover-related information received from the master device.

In addition, a HO occurring in the course of performing the D2D communication can be limited to be performed by a forward HO scheme. In particular, it is important for UEs performing the D2D not to miss an incoming call. Since the incoming call can be supported by paging, it may be preferable to configure a UE performing the D2D communication to perform the forward HO initialized by the UE instead of the backward HO initialized by a request of the eNB. Moreover, in case of using a D2D-dedicated resource (e.g., frequency resource), having received a scheduling request for the D2D communication from the D2D UE, the eNB may forcibly move the D2D UEs to a different frequency or a different RAT via a redirection command.

Figure 17:
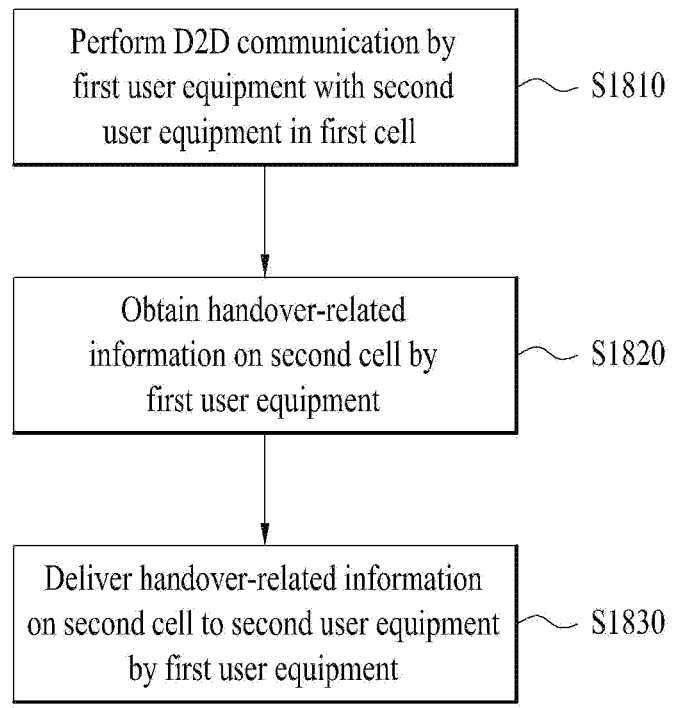
FIG. 17 is a flowchart for an example of a method of performing a D2D communication according to the present invention.

FIG. 17 is a flowchart for an example of a method of performing a D2D communication according to the present invention.

In the step S1810, a first UE can perform a D2D communication with a second UE. In the step S1810, the first and the second UE can be positioned at a first cell.

In the step S1820, the first UE can obtain handover-related information on a second cell. For instance, if both the first and the second UE move to the second cell or if the second UE moves to the second cell while the first UE stays in the first cell, the step S1820 can be performed. The first UE can obtain the handover-related information on the second cell in a manner actually making a handover to the second cell. Or, the first UE may obtain the handover-related information on the second cell while staying in the first cell without moving to the second cell via a virtual handover process.

In the step S1830, the first UE can deliver the handover-related information on the second cell obtained in the step S1820 to the second UE. The handover-related information on the second cell, which is delivered to the second UE, shall be used for an operation performed for the second UE to attach to the second cell, thereby simplifying the operation and reducing a delay.

In addition, if cell-specific D2D-related information of the first cell is different from that of the second cell, the cell-specific D2D-related information can be exchanged between the first and the second cell and can be delivered to the first and the second cell. By doing so, if D2D resource configuration and the like vary according to a cell, coordination on D2D-related information configuration can be performed between cells. Hence, although both the first and the second UE move to a new cell or the first and the second UE belong to cells different from each other, respectively, the D2D communication can be properly performed.

According to the example of FIG. 17, the first and the second UE may correspond to a master and a slave device, respectively. In this case, the first UE can perform a relay node function between the second UE and the eNB (or cell). Further, measurement result for each cell measured by the second UE can be feedback to the eNB (or cell) via the first UE. Or, a UE making a handover may correspond to a master UE all the time.

The aforementioned items explained in various embodiments of the present invention can be implemented in a manner of being independently applied or in a manner that two or more embodiments are simultaneously applied. For clarity, explanation on the overlapped contents is omitted.

Figure 18:
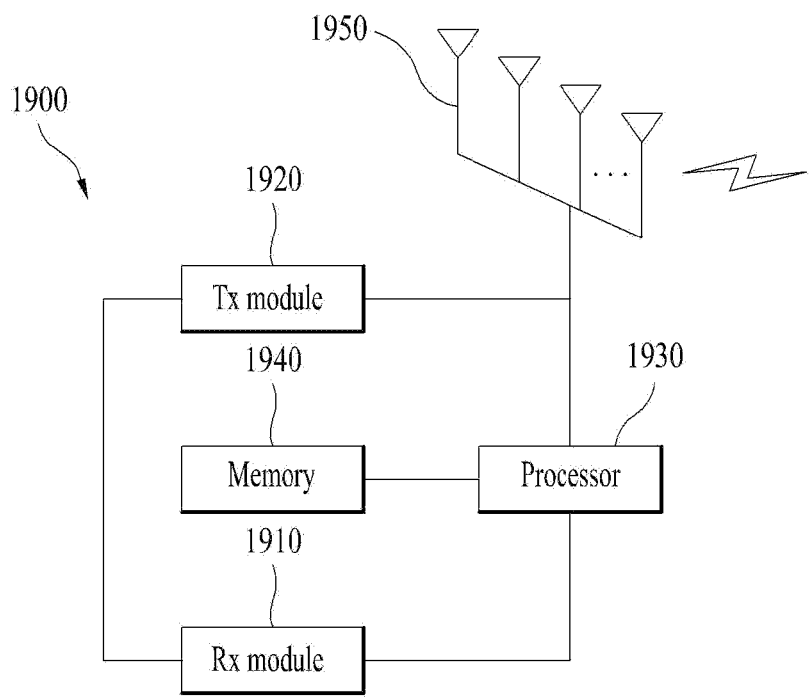
FIG. 18 is a diagram for a configuration of a transceiver according to an example of the present invention.

FIG. 18 is a diagram for a configuration of a transceiver according to an example of the present invention.

Referring to FIG. 18, a transceiver 1900 according to the present invention may include a reception module 1910, a transmission module 1920, a processor 1930, a memory 1940, and a plurality of antennas 1950. A plurality of the antennas 1950 indicates a transceiver supporting MIMO transmission and reception. The reception module 1910 can receive various signal, data, and information from external. The transmission module 1920 can transmit various signals, data, and information to the external. The processor 1930 can control overall operations of the transceiver 1900.

The transceiver 1900 according to one embodiment of the present invention can be configured as a device performing a D2D communication. The processor 1930 of the transceiver 1900 can be configured to make the transceiver 1900 perform a communication with a different transceiver via a D2D link in a first cell. Further, the processor 1930 can be configured to obtain handover-related information on a second cell. Further, the processor 1930 can be configured to deliver the obtained handover-related information on the second cell to the different transceiver using the transmission module 1920.

Besides, the processor 1930 of the transceiver 1900 performs a function of calculating information received by the transceiver 1900, information to be transmitted to the external and the like. The memory 1940 can store the calculated information and the like for a predetermined time and may be replaced with such a configuration element as a buffer (not depicted) or the like.

Detail configuration of the aforementioned transceiver 1900 can be implemented in a manner that the aforementioned items explained in various embodiments of the present invention are independently applied or two or more embodiments are simultaneously applied. For clarity, explanation on the duplicated contents is omitted.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned embodiments of the present invention can be applied to various mobile communication systems.

What is claimed is:

1. A method for performing a D2D (device-to-device) communication in a wireless communication system, comprising:

performing a communication by a first user equipment with a second user equipment via a D2D link in a first cell;

obtaining, by the first user equipment, handover-related information on a second cell; and delivering the obtained handover-related information on the second cell to the second user equipment.

2. The method of claim 1, wherein cell-specific D2D communication-related information on the first and the second cell is exchanged between the first and the second cell.

3. The method of claim 1, wherein cell-specific D2D communication-related information on the first and the second cell is delivered to the first and the second user equipment.

4. The method of claim 2, wherein the cell-specific D2D communication-related information comprises at least one of a resource configuration for the D2D communication, a transmit power configuration, information on whether the D2D communication is permitted, or information on whether charging-related information for the D2D communication is reported.

5. The method of claim 4, wherein a resource for the D2D communication is semi-statically configured and wherein activation and release for the D2D communication is dynamically configured.

6. The method of claim 1, wherein the obtaining is performed when the first user equipment moves to the second cell.

7. The method of claim 1, wherein the obtaining is performed when the second user equipment moves to the second cell.

8. The method of claim 1, wherein the handover-related information on the second cell is obtained via a procedure of handover to the second cell by the first user equipment.

9. The method of claim 8, wherein the handover is performed when the first user equipment does not move to the second cell.

10. The method of claim 1, wherein the handover-related information on the second cell is used for a procedure of attach to the second cell by the second user equipment.

11. The method of claim 1, wherein measurement information on each of the first and the second cell measured by the second user equipment is feedback via the first user equipment.

12. The method of claim 1, wherein the first user equipment corresponds to a master user equipment and wherein the second user equipment corresponds to a slave user equipment.

13. The method of claim 1, wherein the first and the second user equipment operate as a slave user equipment and a master user equipment, respectively, in the first cell, and wherein the first and the second user equipment operate as the master user equipment and the slave user equipment, respectively, in the second cell.

14. The method of claim 1, wherein the handover-related information on the second cell comprises at least one of a cell identifier of the second cell or resource configuration information of the second cell.

15. A first user equipment device performing a D2D (device-to-device) communication in a wireless communication system, comprising:

a reception module configured to receive a signal from an external;

a transmission module configured to transmit the signal to the external; and a processor configured to control the first user equipment device containing the reception module and the transmission module, the processor is further configured to:

perform a communication by the first user equipment device with a second user equipment device via a D2D link in a first cell;

obtain handover-related information on a second cell; and deliver the obtained handover-related information on the second cell to the second user equipment using the transmission module.

* * * * *